US010796538B2

(12) United States Patent
Honda

(10) Patent No.: US 10,796,538 B2
(45) Date of Patent: Oct. 6, 2020

(54) CHANGE MACHINE, MONEY HANDLING SYSTEM, CASH REGISTER, AND MONEY HANDLING METHOD

(71) Applicant: GLORY LTD., Himeji-shi, Hyogo (JP)

(72) Inventor: Masaru Honda, Himeji (JP)

(73) Assignee: Glory LTD., Himeji-shi, Hyoga (JP)

( * ) Notice: Subject to any disclaimer, the term of this patent is extended or adjusted under 35 U.S.C. 154(b) by 92 days.

(21) Appl. No.: 16/004,741

(22) Filed: Jun. 11, 2018

(65) Prior Publication Data

US 2018/0365938 A1 Dec. 20, 2018

(30) Foreign Application Priority Data

Jun. 14, 2017 (JP) ................................ 2017-116480

(51) Int. Cl.
*G06K 7/00* (2006.01)
*G07G 1/12* (2006.01)
(Continued)

(52) U.S. Cl.
CPC ............... *G07G 1/12* (2013.01); *G07D 11/24* (2019.01); *G07D 11/245* (2019.01); *G07D 11/34* (2019.01);
(Continued)

(58) Field of Classification Search
USPC ......................... 235/375-385; 705/5, 35-45
See application file for complete search history.

(56) References Cited

U.S. PATENT DOCUMENTS

2002/0037696 A1* 3/2002 Fletcher .................. G07D 1/00 453/1
2004/0030622 A1 2/2004 Ramos et al.
(Continued)

FOREIGN PATENT DOCUMENTS

EP 2 800 070 A1 11/2014
JP 2009-199187 A 9/2009
WO WO-2005097639 A1 * 10/2005 ............ G07F 9/026

OTHER PUBLICATIONS

European Search Report (Application No. 18177466.2) (10 pages— dated Sep. 11, 2018).

*Primary Examiner* — Matthew Mikels

(74) *Attorney, Agent, or Firm* — Renner, Kenner, Greive, Bobak, Taylor & Weber

(57) ABSTRACT

One object is to efficiently identify number of transactions that can be performed by using an inventory amount of money inside a change machine and to improve the business efficiency. A POS register (290) transmits a total amount request to a change machine (200) connected thereto (Step S11). Upon receiving the total amount request from the POS register (290), a change machine (200) transmits to the POS register (290) a total amount of money that can be dispensed as change and that is calculated based on an inventory amount of one or more predetermined denominations (Step S12). The POS register (290) receives the total amount from the change machine (200) (Step S13) and calculates number of transactions for which the change can be dispensed by calculating how many times is the total amount of the maximum change amount (JPY9, 999) for one transaction (Step S14). The POS register (290) informs the salesclerk of the calculated number of transactions by displaying and the like. Therefore, the salesclerk can confirm the number of transactions and can use this information as a factor to determine a timing of replenishing the change.

9 Claims, 18 Drawing Sheets

(51) Int. Cl.

| | |
|---|---|
| ***G07D 11/24*** | (2019.01) |
| ***G07D 11/34*** | (2019.01) |
| ***G07D 11/245*** | (2019.01) |
| *G07D 11/13* | (2019.01) |
| *G07D 11/14* | (2019.01) |
| *G07D 11/16* | (2019.01) |
| *G07D 11/125* | (2019.01) |
| *G07D 7/181* | (2016.01) |
| *G07D 5/00* | (2006.01) |
| *G07D 9/02* | (2006.01) |

(52) U.S. Cl.

CPC ............... *G07D 5/00* (2013.01); *G07D 7/181* (2017.05); *G07D 9/02* (2013.01); *G07D 11/125* (2019.01); *G07D 11/13* (2019.01); *G07D 11/14* (2019.01); *G07D 11/16* (2019.01); *G07D 2201/00* (2013.01); *G07D 2205/00* (2013.01); *G07D 2207/00* (2013.01); *G07D 2211/00* (2013.01)

(56) References Cited

U.S. PATENT DOCUMENTS

2012/0173352 A1 7/2012 Doi et al.
2017/0140597 A1 5/2017 Takami

* cited by examiner

| | | |
|---|---|---|
| TOTAL AMOUNT | | 29999 |
| INVENTORY AMOUNT BY DENOMINATION | JPY10,000 BANKNOTE | 0 |
| | JPY5,000 BANKNOTE | 2 |
| | JPY1,000 BANKNOTE | 12 |
| | : | : |
| | JPY1 COIN | 9 |

FIG.7

INVENTORY AMOUNT DATA
205a

| | | |
|---|---|---|
| TOTAL AMOUNT | | 29999 |
| INVENTORY AMOUNT BY DENOMINATION | JPY10,000 BANKNOTE | 0 |
| | JPY5,000 BANKNOTE | 2 |
| | JPY1,000 BANKNOTE | 12 |
| | JPY500 COIN | 6 |
| | JPY100 COIN | 44 |
| | JPY50 COIN | 5 |
| | JPY10 COIN | 32 |
| | JPY5 COIN | 4 |
| | JPY1 COIN | 9 |

FIG.8

SUBSTITUTE DISPENSING LIMITING DATA
205b

| | | |
|---|---|---|
| UPPER LIMIT OF TOTAL NUMBER | | 12 |
| UPPER LIMIT OF NUMBER OF DENOMINATIONS | | UNLIMITED |
| LIMIT OF HIERARCHY NUMBER | | UNLIMITED |
| SUBSTITUTION OF BANKNOTE WITH COIN | | PERMITTED |
| SUBSTITUTION OF 5-DENOMINATION SYSTEM WITH 1-DENOMINATION SYSTEM | | PERMITTED |
| SUBSTITUTION OF 1-DENOMINATION SYSTEM WITH 5-DENOMINATION SYSTEM | | PERMITTED |
| SUBSTITUTION OF 5-DENOMINATION SYSTEM WITH 5-DENOMINATION SYSTEM | | PROHIBITED |
| SUBSTITUTION OF 1-DENOMINATION SYSTEM WITH 1-DENOMINATION SYSTEM | | PERMITTED |
| UPPER LIMIT OF NUMBER OF SUBSTITUTES BY DENOMINATION | JPY5,000 BANKNOTE | 0 |
| | JPY1,000 BANKNOTE | 9 |
| | JPY500 COIN | 4 |
| | JPY100 COIN | 10 |
| | JPY50 COIN | 4 |
| | JPY10 COIN | 20 |
| | JPY5 COIN | 4 |
| | JPY1 COIN | 10 |

FIG.17

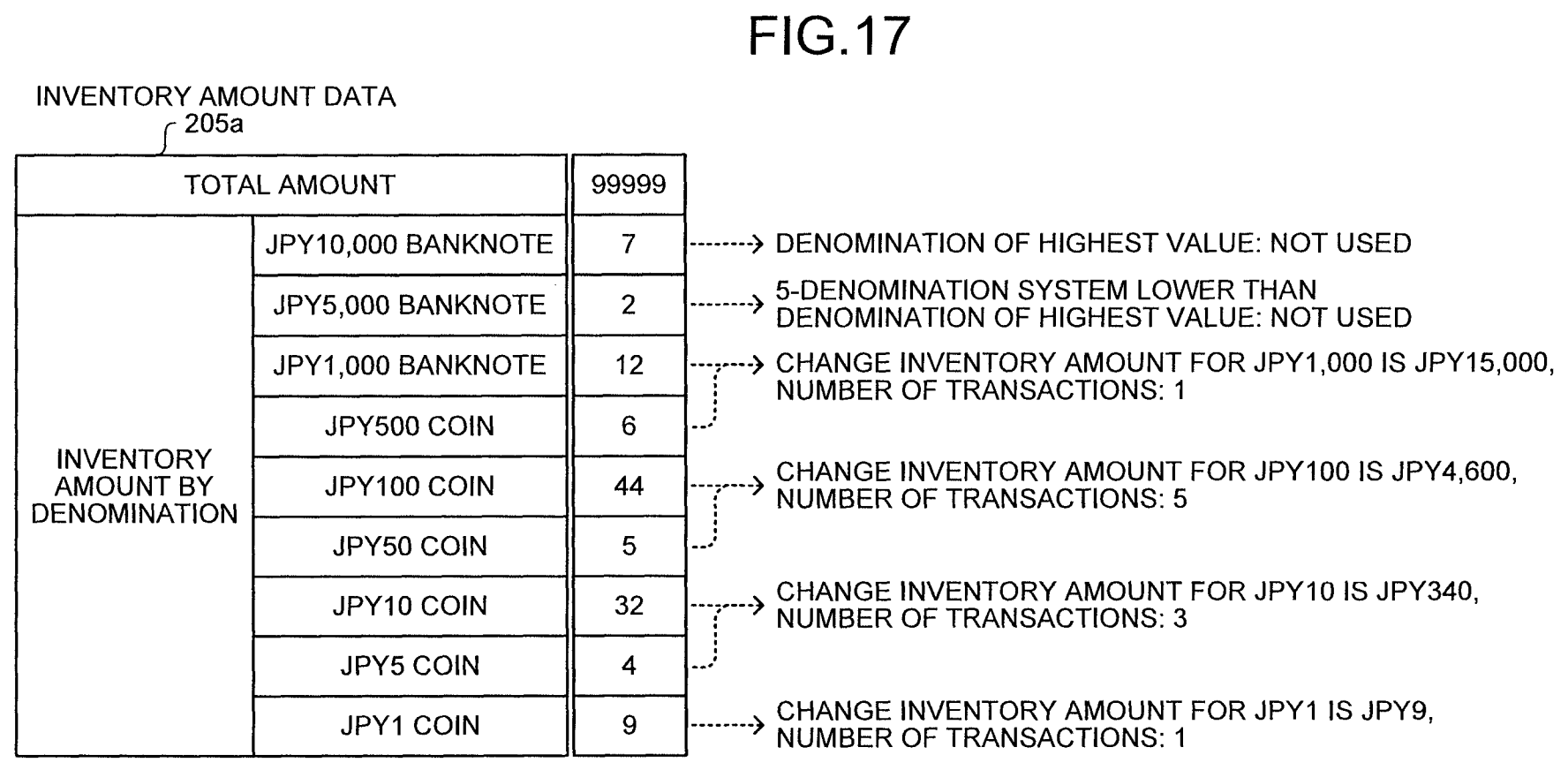

INVENTORY AMOUNT DATA
205a

| | | | |
|---|---|---|---|
| TOTAL AMOUNT | | 99999 | |
| INVENTORY AMOUNT BY DENOMINATION | JPY10,000 BANKNOTE | 7 | DENOMINATION OF HIGHEST VALUE: NOT USED |
| | JPY5,000 BANKNOTE | 2 | 5-DENOMINATION SYSTEM LOWER THAN DENOMINATION OF HIGHEST VALUE: NOT USED |
| | JPY1,000 BANKNOTE | 12 | CHANGE INVENTORY AMOUNT FOR JPY1,000 IS JPY15,000, NUMBER OF TRANSACTIONS: 1 |
| | JPY500 COIN | 6 | (same as above) |
| | JPY100 COIN | 44 | CHANGE INVENTORY AMOUNT FOR JPY100 IS JPY4,600, NUMBER OF TRANSACTIONS: 5 |
| | JPY50 COIN | 5 | (same as above) |
| | JPY10 COIN | 32 | CHANGE INVENTORY AMOUNT FOR JPY10 IS JPY340, NUMBER OF TRANSACTIONS: 3 |
| | JPY5 COIN | 4 | (same as above) |
| | JPY1 COIN | 9 | CHANGE INVENTORY AMOUNT FOR JPY1 IS JPY9, NUMBER OF TRANSACTIONS: 1 |

FIG.18

INVENTORY AMOUNT DATA
205a

| | | |
|---|---|---|
| TOTAL AMOUNT | | 99999 |
| INVENTORY AMOUNT BY DENOMINATION | JPY10,000 BANKNOTE | 7 |
| | JPY5,000 BANKNOTE | 2 |
| | JPY1,000 BANKNOTE | 12 |
| | JPY500 COIN | 6 |
| | JPY100 COIN | 44 |
| | JPY50 COIN | 5 |
| | JPY10 COIN | 32 |
| | JPY5 COIN | 4 |
| | JPY1 COIN | 9 |

INVENTORY AMOUNT DATA FOR CHANGE

| | | |
|---|---|---|
| TOTAL AMOUNT OF MONEY FOR CHANGE | | 29999 |
| INVENTORY AMOUNT BY DENOMINATION | | |
| | JPY5,000 BANKNOTE | 2 |
| | JPY1,000 BANKNOTE | 12 |
| | JPY500 COIN | 6 |
| | JPY100 COIN | 44 |
| | JPY50 COIN | 5 |
| | JPY10 COIN | 32 |
| | JPY5 COIN | 4 |
| | JPY1 COIN | 9 |

CHANGE MACHINE, MONEY HANDLING SYSTEM, CASH REGISTER, AND MONEY HANDLING METHOD

BACKGROUND OF THE INVENTION

1. Field of the Invention

The present invention relates to a change machine, a money handling system, a cash register, and a money handling method capable of efficiently identifying number of transactions that can be performed by using an inventory amount of money inside the machine and improving the business efficiency.

2. Description of the Related Art

A cash register (hereinafter, "POS register") having a sales time management function and a money handling apparatus (hereinafter, "change machine") communicably connected to the POS register are installed in various shops such as a convenience store, a supermarket, and the like. For example, a salesclerk scans a barcode attached to a product by using a barcode reader of the POS register and identifies the price of the product. Then, when the salesclerk inserts in the change machine the money received from a customer, change is dispensed from the change machine.

When a shortage of the change occurs in the change machine, no transaction can be performed on the POS register. A technology in which the POS register issues a status request command to the change machine and acquires from the change machine a status including number of money per denomination, determines whether the change can be dispensed based on the number of money per denomination, and informs about the result is known in the art (e.g., see Japanese Patent Application Laid-Open No. 2009-199187).

However, if only the number of money per denomination is used as disclosed in Japanese Patent Application Laid-Open No. 2009-199187, there may be situations in which the change for how many more transactions can be dispensed cannot be determined. Specifically, when performing substitute dispensing in which money of other denomination (e.g., two JPY50 coins) is dispensed in substitution for money of a certain denomination (e.g., one JPY100 coin) (e.g., see International Patent Publication WO 2011/030437), the change can be dispensed even if there is a shortage of a particular money in the change machine. Therefore, it is difficult to easily determine only from the number of money per denomination whether it is possible to dispense the change.

SUMMARY OF THE INVENTION

The present invention has been made in view of the above discussion. One object of the present invention is to provide a change machine, a money handling system, a cash register, and a money handling method capable of efficiently identifying number of transactions that can be performed by using an inventory amount of money inside the change machine.

To solve the above problems and to achieve the above object, a money handling system according to one aspect of the present invention is a money handling system in which a cash register and a change machine having a storing unit for storing therein money are communicably connected to each other. The money handling system includes a number of transactions calculating unit that calculates a number of transactions for which change can be dispensed based on an amount of money stored in the storing unit.

A change machine according to another aspect of the present invention is a change machine that has a storing unit for storing therein money. The change machine includes a number of transactions calculating unit that calculates number of transactions for which change can be dispensed based on an amount of money stored in the storing unit; and a notifying unit that notifies a predetermined host device of the number of transactions calculated by the number of transactions calculating unit.

A cash register according to still another aspect of the present invention is a cash register that is communicably connected to a change machine that dispenses money of one or more predetermined denominations as change. The cash register includes a receiving unit that receives from the change machine information relating to an amount of money stored in a storing unit of the change machine; and a number of transactions calculating unit that calculates number of transactions for which change can be dispensed based on the amount of money stored in the storing unit of the change machine.

A money handling method according to still another aspect of the present invention is a money handling method that is performed on a money handling system in which a cash register and a change machine having a storing unit for storing therein money are communicably connected to each other. The money handling method includes calculating a number of transactions for which change can be dispensed based on an amount of money stored in the storing unit; and informing about the number of transactions.

A money handling method according to still another aspect of the present invention is a money handling method that is performed on a change machine having a storing unit for storing therein money. The money handling method includes calculating a number of transactions for which change can be dispensed based on an amount of money stored in the storing unit; and notifying a predetermined host device of the number of transactions.

A money handling method according to still another aspect of the present invention is a money handling method that is performed on a cash register that is communicably connected to a change machine that dispenses money of one or more predetermined denominations as change. The money handling method includes receiving from the change machine information relating to an amount of money stored in a storing unit of the change machine; and calculating number of transactions for which the change can be dispensed based on the information relating to the amount of money stored in the storing unit of the change machine.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 7 is a table showing a concrete example of inventory amount data shown in FIG. 6.

FIG. 8 is a table showing a concrete example of substitute dispensing limiting data shown in FIG. 6.

FIG. 17 is a view for explaining a total amount by digit and the number of transactions.

FIG. 18 is a view for explaining inventory amount data for change.

EMBODIMENTS

Exemplary embodiments of a change machine, a money handling system, a cash register, and a money handling method according to the present invention are explained below with reference to the accompanying drawings. The present embodiment explains an example in which the present invention is applied to a money handling system installed in a shop such as a convenience store and a supermarket.

Concept of Money Handling System According to Present Invention

In a shop such as a convenience store and a supermarket are arranged a POS register, which is a cash register in which product data relating to products purchased by a customer is input, and a change machine connected to the POS register, dispenses the change depending on the cash received by a salesclerk from the customer, and stores therein the received cash. Sometimes several money handling systems each including the POS register and the change machine are arranged in the shop, and sales data present in the POS registers is accumulated in a server of the shop.

Figure 1A:
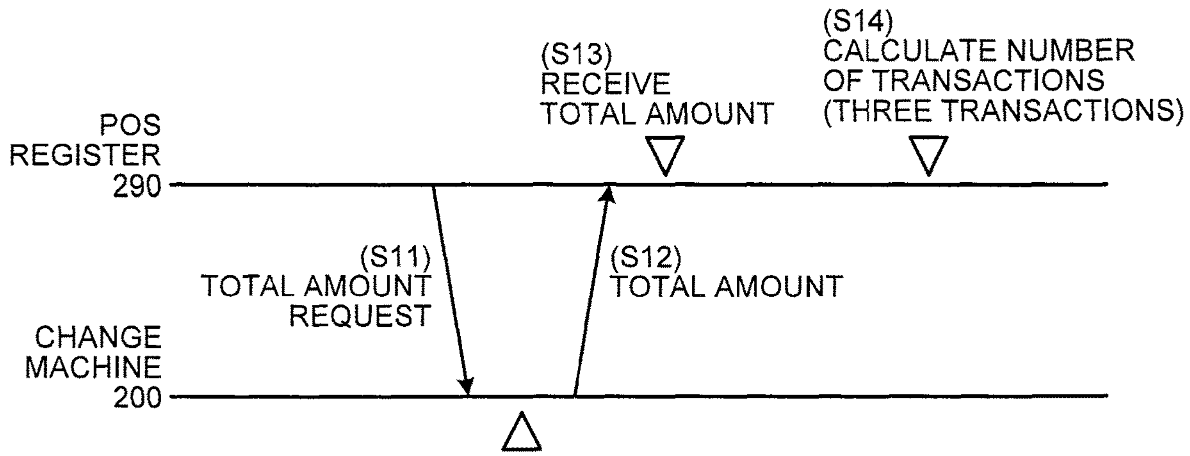
FIGS. 1A and 1B are views for explaining a concept of a money handling system according to the present embodiment.
Figure 1B:
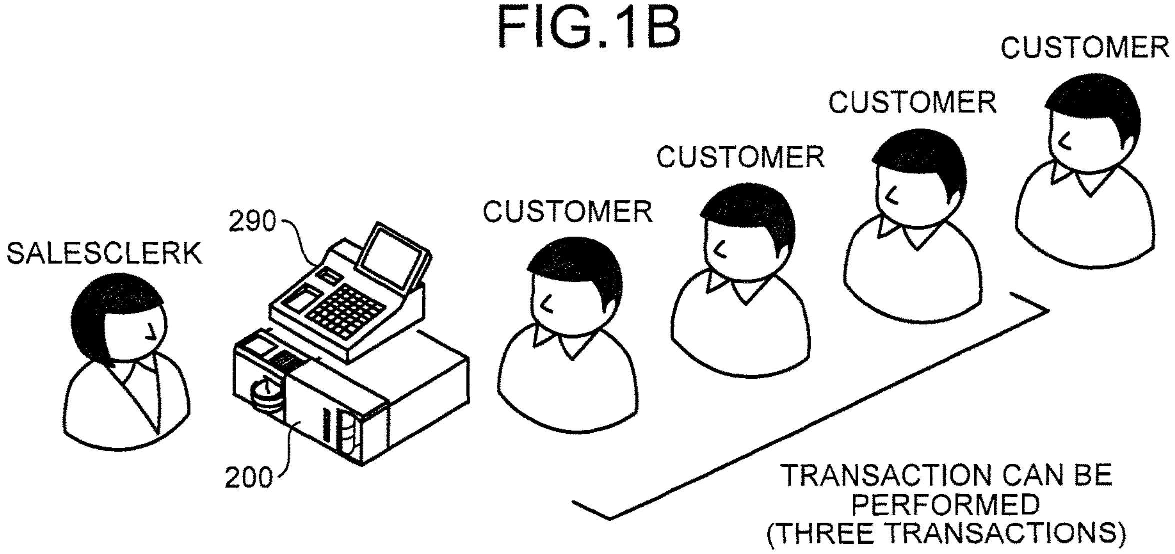

FIGS. 1A and 1B are views for explaining the concept of the money handling system according to the present embodiment. As shown in FIG. 1A, a POS register 290 according to the present embodiment can transmit a total amount request to a change machine 200 connected thereto (Step S11). The change machine 200 stores therein an inventory amount of one or more predetermined denominations for all the money stored inside thereof. Upon receiving the total amount request from the POS register 290, the change machine 200 transmits to the POS register 290 a total amount of money that can be dispensed as the change and that is calculated based on the inventory amount of one or more predetermined denominations (Step S12).

The POS register 290 receives the total amount from the change machine 200 (Step S13) and calculates number of transactions for which the change can be dispensed (Step S14). When the denomination of the highest value is JPY10,000, and the denomination of the lowest value is JPY1, then the change occurring in one transaction at the most will be JPY9,999. Therefore, by calculating how many times of JPY9,999 is the total amount received from the change machine 200, the number of transactions for which the change can be dispensed can be calculated.

In the example shown in FIG. 1A, because the total amount of money that the change machine 200 can dispense is "JPY29, 999", the number of transactions is "3". When there are several customers as shown in FIG. 1B, generally, purchase of one or more products by one customer is counted as one transaction. Therefore, if the number of transactions is "3", it can be considered that the change has been secured for the transactions by three persons.

The POS register 290 informs the salesclerk of the calculated number of transactions by displaying and the like. Therefore, the salesclerk can confirm the number of transactions and can use this information as a factor to determine a timing of replenishing the change.

In this manner, by calculating the number of transactions for which the change can be dispensed based on the total amount of money stored in the change machine 200 and informing the salesclerk of the number of transactions, the number of transactions that can be performed by using an inventory amount of money in the change machine 200 can be identified efficiently and the business efficiency can be improved.

Particularly, when performing the substitute dispensing, in which the change is dispensed by using the money of another denomination when there is a shortage of the money of a certain denomination, because it is difficult to determine from only the number of money per denomination whether it is possible to dispense the change, the number of transactions calculated based on the total amount is an important factor.

Configuration of Change Machine 200

Figure 2:
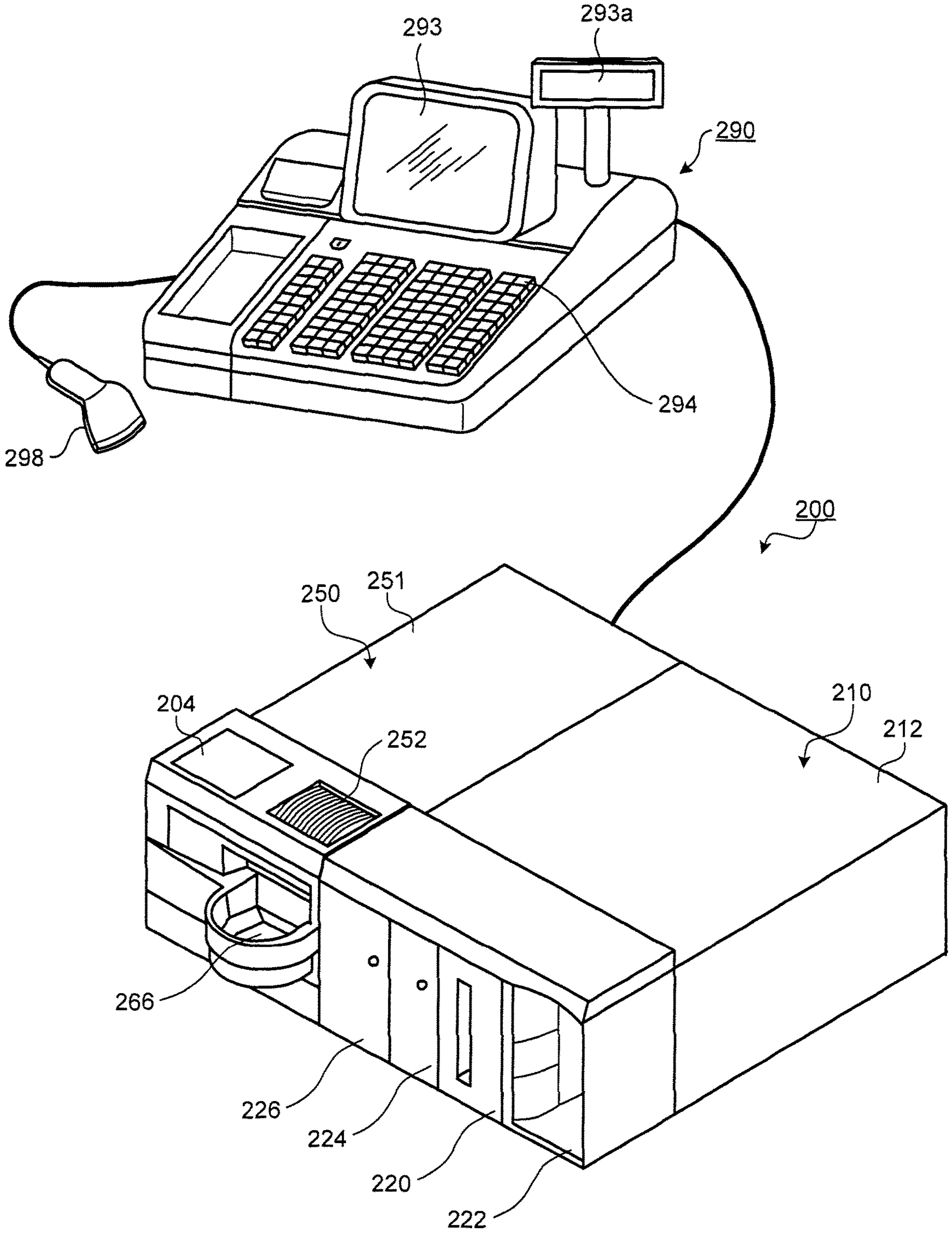
FIG. 2 is a perspective view of an external configuration of a change machine and a POS register.

A detailed configuration of the change machine 200 is explained below by using FIGS. 2 to 6. As shown in FIG. 2 and the like, the change machine 200 according to a first embodiment includes a coin handling unit 250 and a banknote handling unit 210 arranged on one side of the coin handling unit 250. The POS register 290 is arranged above the banknote handling unit 210 and the coin handling unit 250. The banknote handling unit 210 and the coin handling unit 250 perform money deposition/dispensing process of banknotes and coins, respectively. The POS register 290 is used as a management apparatus that manages the change machine 200.

Figure 3:
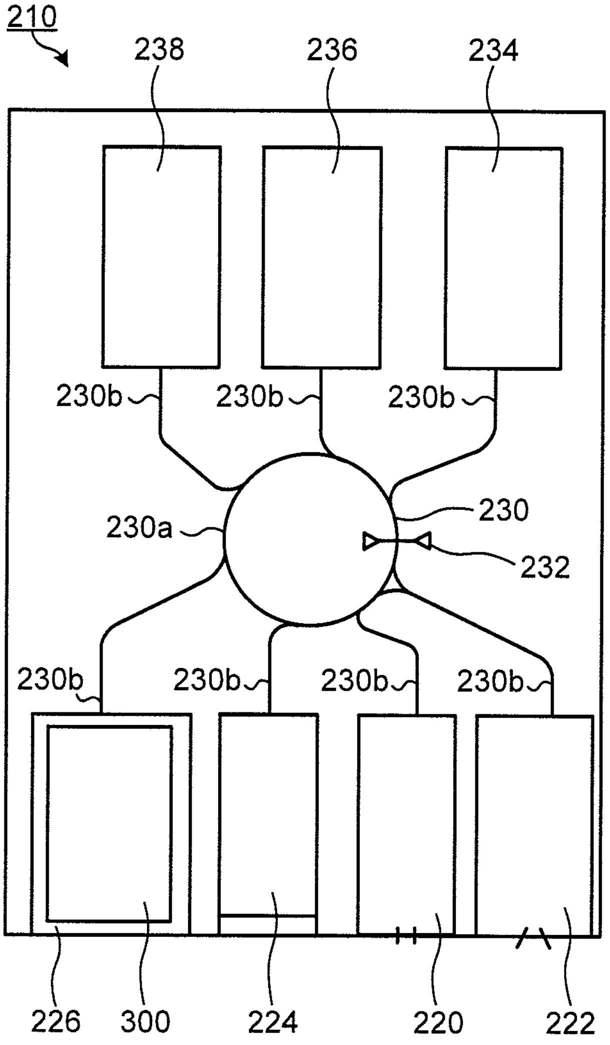
FIG. 3 is a view of an internal configuration of a banknote handling unit in the change machine.

To begin with, a detailed configuration of the banknote handling unit 210 is explained by using FIGS. 2 and 3. As shown in FIGS. 2 and 3, the banknote handling unit 210 includes a housing 212 of a substantially rectangular parallelepiped shape, a banknote receiving unit 222, a banknote dispensing unit 220, a dispensing money reject unit 224, and a cassette mounting unit 226 provided in a front surface of the housing 212.

The banknote receiving unit 222 receives a banknote inserted by the operator and takes the banknote inside the banknote handling unit 210. The banknote dispensing unit 220 dispenses a banknote from the inside of the banknote handling unit 210 to the outside.

In the cassette mounting unit 226 can be attached and detached a storing cassette to be used for collection of proceeds of sales and replenishment of the change. A banknote that is not suitable for dispensing, such as a banknote whose denomination cannot be recognized, is stacked in the dispensing money reject unit 224.

The banknote handling unit 210 includes a transport unit 230 that transports banknotes one by one inside the housing 212, and a plurality of banknote storing units 234, 236, and 238 that store banknotes inside the housing 212 in a manner that allows the banknotes to be fed out. In FIG. 3, a side surface on the bottom of the housing 212 is a surface on the front side of the banknote handling unit 210, and an upward direction in FIG. 3 is the depth direction of the banknote handling unit 210.

As shown in FIG. 3, the transport unit 230 includes a circling transport unit 230*a* arranged at central location of the housing 212 and a plurality of connecting transport units 230*b*. The cassette mounting unit 226 in which the banknote receiving unit 222, the banknote dispensing unit 220, the dispensing money reject unit 224, and a storing cassette 300 can be detachably attached and the three banknote storing units 234, 236, and 238 are arranged surrounding the circling transport unit 230*a*.

As shown in FIG. 3, the banknote receiving unit 222, the banknote dispensing unit 220, the dispensing money reject unit 224, the cassette mounting unit 226 and the three banknote storing units 234, 236, and 238, and the circling transport unit 230*a* are connected to each other by each of the connecting transport units 230*b*. A recognition unit 232 is arranged along the circling transport unit 230*a*. The recognition unit 232 recognizes a denomination, authenticity, fitness, face side up/back side up, transportation state and the like of the banknote transported by the circling transport unit 230*a*.

The circling transport unit 230*a* can transport the banknotes one by one in any of a clockwise direction and a counterclockwise direction in FIG. 3. In the transport unit 230, a not-shown path switching member capable of switching transportation paths of the banknote between the circling transport unit 230*a* and each of the connecting transport units 230*b* is arranged along the circling transport unit 230*a*.

As shown in FIGS. 2 and 3, a banknote inlet of the banknote receiving unit 222 and a banknote outlet of the banknote dispensing unit 220 are arranged on the front surface of the housing 212. The storing cassette 300 can be attached/detached to/from the cassette mounting unit 226.

A banknote feeding mechanism 221 is arranged in the banknote receiving unit 222. When it is detected that one or more banknotes are inserted in a money deposition/dispensing port, the banknote feeding mechanism 221 is driven so that the banknotes are fed one by one toward the circling transport unit 230*a* side via the connecting transport unit 230*b*.

The banknote dispensing unit 220 is configured to dispense from the banknote outlet to the outside of the housing 212 the banknote fed by each of the banknote storing units 234, 236, and 238 to the circling transport unit 230*a*.

Among the banknotes fed by each of the banknote storing units 234, 236, and 238 in the money dispensing process, the dispensing money reject unit 224 stores, as a dispensing money reject banknote, a banknote that cannot be recognized in the recognition unit 232 due to a transportation abnormality such as multifeed, skew, and the like. Moreover, among the banknotes taken from the banknote receiving unit 222 to the inside of the housing 212 in the money deposition process, a banknote that cannot be recognized in the recognition unit 232 due to stain, damage, and the like is returned to the banknote dispensing unit 220 as a deposited money reject banknote.

Each of the banknote storing units 234, 236, and 238 stores therein the banknote by the denomination of the banknote based on a recognition result obtained in the recognition unit 232. The banknotes deposited as proceeds of sales in the banknote handling unit 210 and/or the banknotes that should be dispensed as the change are stored in these banknote storing units 234, 236, and 238. For example, JPY1,000 notes are stored in the banknote storing unit 234, and JPY5,000 notes are stored in the banknote storing unit 236, and JPY10,000 notes are stored in the banknote storing unit 238. Moreover, a banknote feeding mechanism 235, 237, and 239 is arranged in the banknote storing unit 234, 236, and 238, respectively. The banknotes stored in any of these banknote storing units 234, 236, and 238 are fed one by one toward the circling transport unit 230*a* side via the connecting transport unit 230*b* by each of the banknote feeding mechanisms 235, 237, and 239.

Figure 4:
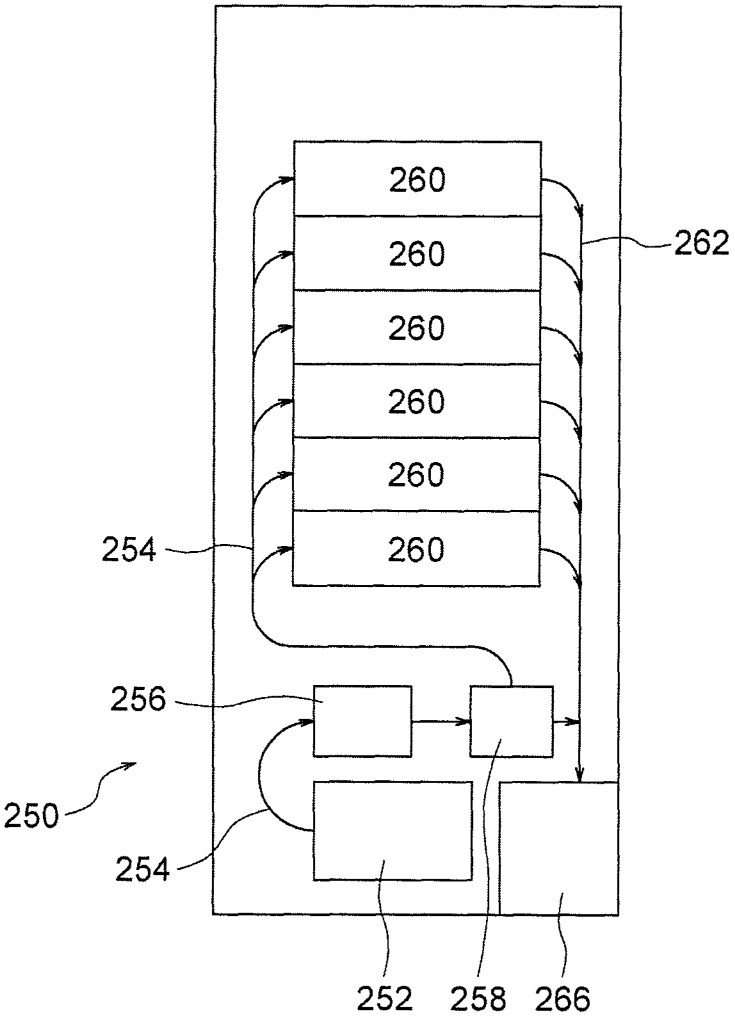
FIG. 4 is a view of an internal configuration of a coin handling unit in the change machine.

A configuration of the coin handling unit 250 is explained next. As shown in FIGS. 2 and 4, the coin handling unit 250 includes a housing 251 of a substantially rectangular parallelepiped shape, a coin receiving unit 252 arranged on a front surface side of the housing 251, a coin dispensing unit 266 arranged below the coin receiving unit 252 on the front surface side of the housing 251, and a plurality of storing and feeding units 260 that store coins inside the housing 251 in a manner that allows the coins to be fed out.

The coin receiving unit 252 receives coins inserted from a coin insertion opening and takes the coins inside of the housing 251 one by one in one layer and one line. Specifically, a coin feeding mechanism 253 (see FIG. 6) constituted by a feeding belt and the like is arranged in the coin receiving unit 252. When it is detected that the coins are received in the coin receiving unit 252, the coin feeding mechanism 253 is driven so that the coins are fed to the inside of the housing 251 one by one by the coin feeding mechanism 253. Moreover, as shown in FIG. 4, an inserted money transport unit 254 that transports the coins fed to the inside of the housing 251 by the coin receiving unit 252 is connected to the coin receiving unit 252.

As shown in FIG. 4, in the middle of the inserted money transport unit 254 are arranged a recognition unit 256 that recognizes a denomination, authenticity, fitness, face side up/back side up, transportation state, and the like of the coins, and a diverter 258. Based on a recognition result of the coin obtained in the recognition unit 256, the diverter 258 diverts the coin that should be dispensed from the coin dispensing unit 266, such as a reject coin, from the inserted money transport unit 254, and guides such a coin to a dispensing money transport unit 262.

On the other hand, the coin that should be stored inside the housing 251, such as a normal coin, is transported by the inserted money transport unit 254 to one of the storing and feeding units 260. The storing and feeding units 260 store therein the coins by the denomination of the coin in a manner that allows the coins to be fed out. For example, six storing and feeding units 260 are arranged for the six denominations of coins (JPY500 coin, JPY100 coin, JPY50 coin, JPY10 coin, JPY5 coin, JPY1 coin) circulating in Japan. The coins are stored in each of the storing and feeding units 260 of one or more predetermined denominations of the coins in the ascending order of the value of the coins from upstream (i.e., bottom in FIG. 4) of the inserted money transport unit 254. Moreover, a not-shown coin feeding mechanism that feeds the coins that have been stored in the storing and feeding unit 260 one by one to the dispensing money transport unit 262 is arranged in the storing and feeding unit 260.

The dispensing money transport unit 262 transports the coins fed by the storing and feeding unit 260 to the coin dispensing unit 266. Moreover, the dispensing money transport unit 262 transports the reject coin and the like that is diverted by the diverter 258 from the inserted money transport unit 254 to the coin dispensing unit 266.

Configuration of POS Register

Figure 5:
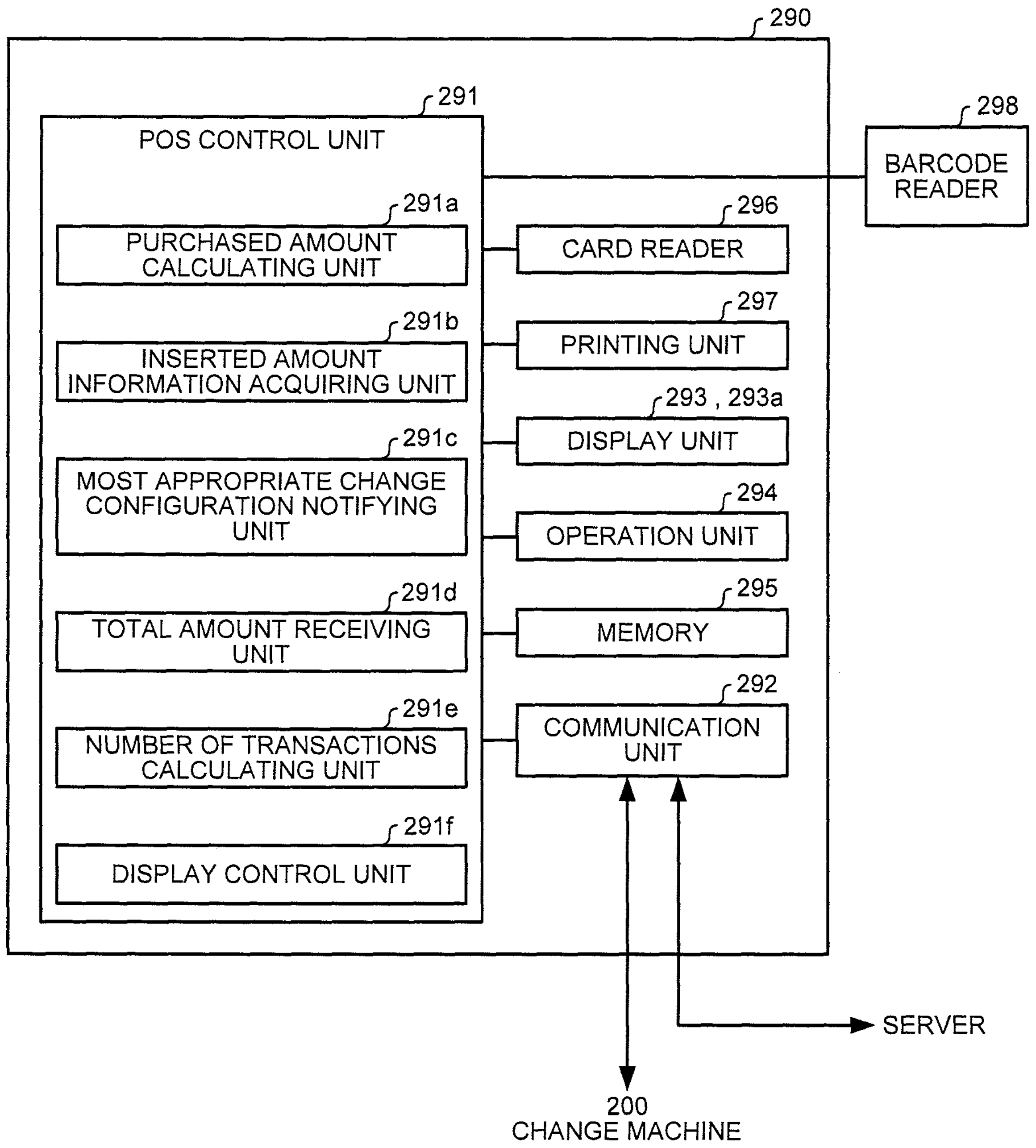
FIG. 5 is a functional block diagram of the POS register shown in FIG. 2.

A detailed configuration of the POS register 290 is explained next. As shown in FIGS. 2 and 5, the POS register 290 includes a display unit 293 for the operator, a display unit 293*a* for the customer, an operation unit 294 such as operation keys, a barcode reader 298, a card reader 296, a printing unit 297, a memory 295, a communication unit 292, and a POS control unit 291.

The display unit 293 is a display unit for the operator. The display unit 293 is used to display a scanning result of product information, various information relating to the purchase, information such as a handling state and an inventory amount of the change machine 200. The display unit 293*a* is a display unit for the customer. The display unit 293*a* is used to display a scanning result of the product information, and various information relating to the purchase such as a total amount and a change amount. The operation unit 294 is used by the operator to perform various operations and input various values and instructions.

The information relating to the product is acquired by the barcode reader 298 by scanning the barcode attached to the product, and decoding the barcode. The card reader 296 is used for scanning an ID card of the operator (a person in-charge of the cash register), for scanning a credit card of the customer, and the like. The printing unit 297 is used for issuing a receipt on which transaction contents are printed.

The memory 295 is a storage device constituted by any of a nonvolatile memory such as a flash memory, a secondary storage medium such as a hard disk drive, and the like. The memory 295 is used to store therein a cash settlement process computer program that is executed by the POS control unit 291, temporarily store the product information read from the product, temporarily store other various information relating to the purchase, and the like. The communication unit 292 is a communication interface that performs communication with the change machine 200 and a host server.

The POS control unit 291 is a control unit that controls the entire POS register 290. The POS control unit 291 includes a purchased amount calculating unit 291*a*, an inserted amount information acquiring unit 291*b*, a most appropriate change configuration notifying unit 291*c*, a total amount receiving unit 291*d*, a number of transactions calculating unit 291*e*, and a display control unit 291*f*. As a practical matter, when a CPU (Central Processing Unit) loads the cash settlement process computer program from the memory 295 and executes the program, a process corresponding to each of the purchased amount calculating unit 291*a*, the inserted amount information acquiring unit 291*b*, the most appropriate change configuration notifying unit 291*c*, the total amount receiving unit 291*d*, the number of transactions calculating unit 291*e*, and the display control unit 291*f* is executed.

The purchased amount calculating unit 291*a* is a processing unit that calculates a purchased amount of the product purchased by the customer based on the information of the product acquired by the barcode reader 298 and/or the information of the product input by using the operation unit 294.

When the purchased amount has been calculated by the purchased amount calculating unit 291*a*, the inserted amount information acquiring unit 291*b* transmits a deposition request to the change machine 200 and acquires amount information relating to the inserted money that has been inserted in the change machine 200.

The most appropriate change configuration notifying unit 291*c* calculates a difference between the purchased amount and the inserted money amount as the change amount, obtains the most appropriate change configuration for which the total number of money for each of the denominations of the money corresponding to the change amount becomes minimum, and transmits a dispensing request containing this most appropriate change configuration to the change machine 200.

The total amount receiving unit 291*d* is a processing unit that transmits the total amount request to the change machine 200, and receives the total amount from the change machine 200. The total amount request is transmitted, for example, every time a transaction is completed.

The number of transactions calculating unit 291*e* is a processing unit that calculates the number of transactions for which the change can be dispensed based on the total amount received from the change machine 200. Specifically, the number of transactions is a quotient obtained by dividing the total amount by a value obtained by subtracting the lowest value of denominations from the highest value of denominations.

The display control unit 291*f* performs a processing to control the display unit 293 to display the number of transactions calculated by the number of transactions calculating unit 291*e*. Moreover, upon receiving the information relating to the substitute dispensing from the change machine 200, the display control unit 291*f* controls the display unit 293 to display the information relating to the substitute dispensing.

Specifically, upon receiving a notice from the change machine 200 that the change having a substitute change configuration that is different from the most appropriate change configuration has been dispensed, the display unit 293 is controlled to display information that indicates that the substitute dispensing has been performed. Moreover, if the configuration of the dispensed denomination is included in the notice from the change machine 200, the display unit 293 is controlled to display information such as the configuration of the denomination and for which denomination the substitute dispensing has been performed.

Note that, when the substitute dispensing becomes necessary, a permission for the substitute dispensing may be obtained from the customer before actually dispensing the change. In this case, it is desirable to obtain the permission from the customer after displaying the substitute change configuration on the display unit 293*a* and causing the customer to confirm the substitute change configuration.

Configuration of Control System of Change Machine 200

A configuration of a control system of the change machine 200 is explained next by using FIG. 6. The banknote handling unit 210 of the change machine 200 has a configuration in which a communication unit 240, the transport unit 230, the recognition unit 232, and each of the banknote feeding mechanism (the banknote feeding mechanism 221, 235, 237, and 239), and the cassette mounting unit 226 are connected to a banknote control unit 210*a*.

The communication unit 240 is a communication interface that communicates with the coin handling unit 250. The banknote control unit 210*a* transports the banknote by driving the transport unit 230 and each of the banknote feeding mechanism based on the recognition result of the banknote obtained in the recognition unit 232, and transmits a result of transport of the banknote to the coin handling unit 250. The banknote control unit 210*a* acquires information about an attachment state of the cassette from the cassette mounting unit 226, and transmits the attachment state to the coin handling unit 250.

The coin handling unit 250 of the change machine 200 has a configuration in which a communication unit 203, an operation/display unit 204, a memory 205, and a coin control unit 250*a* are connected to a host control unit 202, and the coin feeding mechanism 253, the inserted money transport unit 254, the recognition unit 256, the diverter 258, each of the storing and feeding units 260, and the dispensing money transport unit 262 are connected to the coin control unit 250*a*.

The coin control unit 250*a* transports the coin by driving the coin feeding mechanism 253, the inserted money transport unit 254, the diverter 258, each of the storing and feeding units 260, and the dispensing money transport unit 262 based on the recognition result of the coin obtained in the recognition unit 256, and transmits a result of transport of the coin to the host control unit 202.

The communication unit 203 is a communication interface that communicates with the banknote handling unit 210 and the POS register 290. The operation/display unit 204 is a touch panel and the like arranged on a top surface of the housing 251 of the coin handling unit 250. An operation screen for the operator to operate, and information relating to the inventory amount of money stored in each of the banknote handling unit 210 and the coin handling unit 250 are displayed on the operation/display unit 204. The operator can input various commands into the host control unit 202 by touching with his finger one or more operation button present in the operation screen displayed on the operation/display unit 204.

The memory 205 is a storage device constituted by any of a nonvolatile memory such as a flash memory, a secondary storage medium such as a hard disk drive, and the like. Inventory amount data 205*a* and substitute dispensing limiting data 205*b* are stored in the memory 205. The inventory amount data 205*a* is data relating to the inventory amount of money stored in each of the banknote handling unit 210 and the coin handling unit 250. The substitute dispensing limiting data 205*b* is data indicating limitation when performing the substitute dispensing.

Upon receiving the deposition request from the POS register 290, the host control unit 202 instructs the coin control unit 250*a* and the banknote control unit 210*a* to receive the money that has been inserted. The coin control unit 250*a* and the banknote control unit 210*a* perform the money deposition process by transporting the inserted money after receiving the instruction from the host control unit 202 to the corresponding storing unit, and transmit a result of money deposition process to the host control unit 202.

Upon receiving the result of money deposition process from the coin control unit 250*a* and the banknote control unit 210*a*, the host control unit 202 updates the inventory amount data 205*a*, calculates the total amount of the inserted money, and transmits the total amount to the POS register 290 as money information relating to the inserted money.

Upon receiving from the POS register 290 the dispensing request in which the denomination and number of money to be dispensed have been specified, the host control unit 202 instructs the coin control unit 250*a* and the banknote control unit 210*a* to dispense the money. The coin control unit 250*a* and the banknote control unit 210*a* feed from the corresponding storing unit the money of the denomination and number included in the instruction received from the host control unit 202 thereby performing the money dispensing process, and transmit a result of money dispensing process to the host control unit 202.

Upon receiving the result of money dispensing process from the coin control unit 250*a* and the banknote control unit 210*a*, the host control unit 202 updates the inventory amount data 205*a*, and transmits a notice indicating normal completion of the dispensing of the change to the POS register 290.

In case it is not possible to dispense the money of the specified denomination and number, the host control unit 202 replaces the money of the specified denomination with the money of other denomination and performs the substitute dispensing so that the total amount of the dispensed money will be the same. It is not possible to dispense the money of the specified denomination and number when there is a shortage of the inventory amount of the specified denomination, when it not possible to transport the money of the specified denomination appropriately, and the like.

Furthermore, the host control unit 202 receives the total amount request from the POS register 290 and performs a process to notify about the total amount.

The host control unit 202 includes, as processing units relating to the substitute dispensing and the notification of the total amount, a substitute dispensing limiting management unit 202*a*, a substitute dispensing processing unit 202*b*, a substitute dispensing notifying unit 202*c*, a total amount calculating unit 202*d*, and a total amount notifying unit 202*e*.

The substitute dispensing limiting management unit 202*a* is a processing unit that stores the substitute dispensing limiting data 205*b* in the memory 205. Specifically, as the limits of the substitute dispensing, an upper limit of total number, an upper limit of number of denominations, an upper limit of hierarchy number, a limit relating to type of money, a limit relating to denomination system, an upper limit of number of substitutes of one or more predetermined denominations, and the like can be considered.

The upper limit of total number is a limit on the total number of money to be dispensed as the change. The upper limit of number of denominations is a limit on the number of denominations of money to be dispensed as the change. The upper limit of hierarchy number is a limit number that tells up to how many lower order denominations can be used when substituting the money of a certain denomination with the money of a denomination that is lower than the certain denomination. For example, when substituting a JPN100 coin with other money, if the upper limit of hierarchy number is "2", a substitution is allowed to one lower order, i.e., with two JPY50 coins, or allowed to two lower orders, i.e., with ten JPY10 coins. Moreover, if the upper limit of number of denominations permits, the substitution can be performed with one JPY50 coin and five JPY10 coins.

Whether it is allowed to use the coins as the substitute of the banknotes is defined by the limit relating to type of money. The limit relating to denomination system is a limit relating to a combination of a 5-denomination system and a 1-denomination system. The 5-denomination system includes JPY5,000 banknotes, JPY500 coins, JPY50 coins, and JPY5 coins. The 1-denomination system includes JPY10,000 banknotes, JPY1,000 banknotes, JPY100 coins, JPY10 coins, and JPY1 coins.

In the limit relating to denomination system is set whether to allow substitution of the 5-denomination system with the lower 1-denomination system, whether to allow substitution of the 1-denomination system with the lower 5-denomination system, whether to allow substitution of the 5-denomination system with the lower 5-denomination system, and whether to allow substitution of the 1-denomination system with the lower 1-denomination system.

The upper limit of number of substitutes of one or more predetermined denominations is number of money of one or more predetermined denominations that can be used in the substitution. For example, if the upper limit of number of substitutes of one or more predetermined denominations for JPY5 coin is "4", it is possible to dispense four JPY5 coins for an amount JPY20.

In case it is not possible to dispense the money of the specified denomination and number, the substitute dispensing processing unit 202*b* substitutes the money of the denomination that cannot be dispensed with the money of other denominations within the limits defined in the substitute dispensing limiting data 205*b*, and performs the substitute dispensing.

When the substitute dispensing is performed by the substitute dispensing processing unit 202*b*, the substitute dispensing notifying unit 202*c* notifies the POS register 290 of a dispensing result indicating that the change of the denomination and number (substitute change configuration) that is different from the change of the denomination and number included in the dispensing request from the POS register 290 (most appropriate change configuration) has been dispensed. Such a notice can include information about the denomination and number that was dispensed and/or information about for which denomination the substitute dispensing was performed.

The total amount calculating unit 202*d* is a processing unit that calculates the total amount of money stored in the banknote handling unit 210 and the coin handling unit 250. When the inventory amount of one or more predetermined denominations in the inventory amount data 205*a* has been updated, the total amount calculating unit 202*d* calculates the total amount of inventory amount of one or more predetermined denominations, and updates the total amount in the inventory amount data 205*a*. When taking the total amount of inventory amount of one or more predetermined denominations as the total amount of money that can be dispensed as the change, the total amount included in the inventory amount data 205*a* can be used. Note that, for example, it is possible to obtain the total amount of money that can be dispensed as the change by excluding the JPY10,000 banknote that is never used as the change. Details about the method of using some amount other than the total amount included in the inventory amount data 205*a* as the total amount of money that can be dispensed as the change will be given later.

The total amount notifying unit 202*e* is a processing unit that, upon receiving the total amount request from the POS register 290, transmits to the POS register 290 the total amount of money that can be dispensed as the change calculated by the total amount calculating unit 202*d*.

Figure 6:
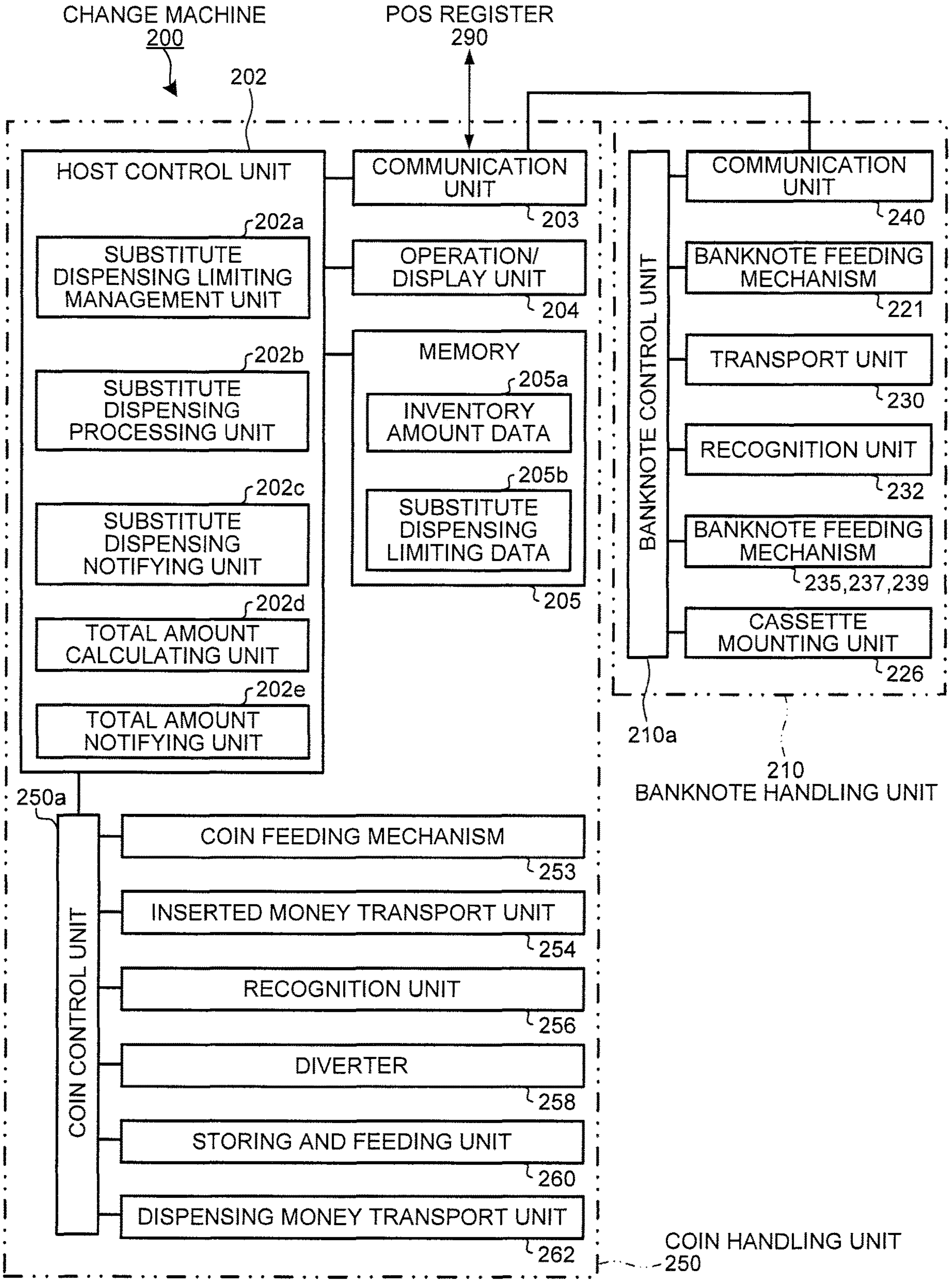
FIG. 6 is a functional block diagram of the change machine shown in FIG. 2.

A concrete example of data that is stored in the memory 205 shown in FIG. 6 is explained next. FIG. 7 is a table showing a concrete example of the inventory amount data 205*a* shown in FIG. 6. The inventory amount data 205*a* shown in FIG. 7 shows that the total amount of the inventory amount is "JPY29,999", the inventory amount of the JPY10,000 banknote is "0", the inventory amount of the JPY5,000 banknote is "2", the inventory amount of the JPY1,000 banknote is "12", the inventory amount of the JPY500 coin is "6", the inventory amount of the JPY100 coin is "44", the inventory amount of the JPY50 coin is "5", the inventory amount of the JPY10 coin is "32", the inventory amount of the JPY5 coin is "4", and the inventory amount of the JPY1 coin is "9".

FIG. 8 is a table showing a concrete example of the substitute dispensing limiting data 205*b* shown in FIG. 6. The substitute dispensing limiting data 205*b* shown in FIG. 8 shows that the upper limit of total number is "12", the upper limit of number of denominations is "unlimited", and the upper limit of hierarchy number is "unlimited".

Moreover, in the substitute dispensing limiting data 205*b*, as the limit relating to type of money, "permitted" is set thereby permitting the substitute dispensing by substituting the banknotes with the coins. Moreover, as the limit relating to denomination system, "permitted" is set thereby permitting the substitute dispensing by substituting the 5-denomination system with the 1-denomination system, "permitted" is set thereby permitting the substitute dispensing by substituting the 1-denomination system with the 5-denomination system, "prohibited" is set thereby prohibiting the substitute dispensing by substituting the 5-denomination system with the 5-denomination system, and "permitted" is set thereby permitting the substitute dispensing by substituting the 1-denomination system with the 1-denomination system.

Moreover, in the substitute dispensing limiting data 205*b*, as the upper limit of number of substitutes of one or more predetermined denominations, the upper limit of the JPY5,000 banknote is set to "0", the upper limit of the JPY1,000 banknote is set to "9", the upper limit of the JPY500 coin is set to "4", the upper limit of the JPY100 coin is set to "10", the upper limit of the JPY50 coin is set to "4", the upper limit of the JPY10 coin is set to "20", the upper limit of the JPY5 coin is set to "4", and the upper limit of the JPY1 coin is set to "10".

Process Procedure Performed by Money Handling System

Figure 9:
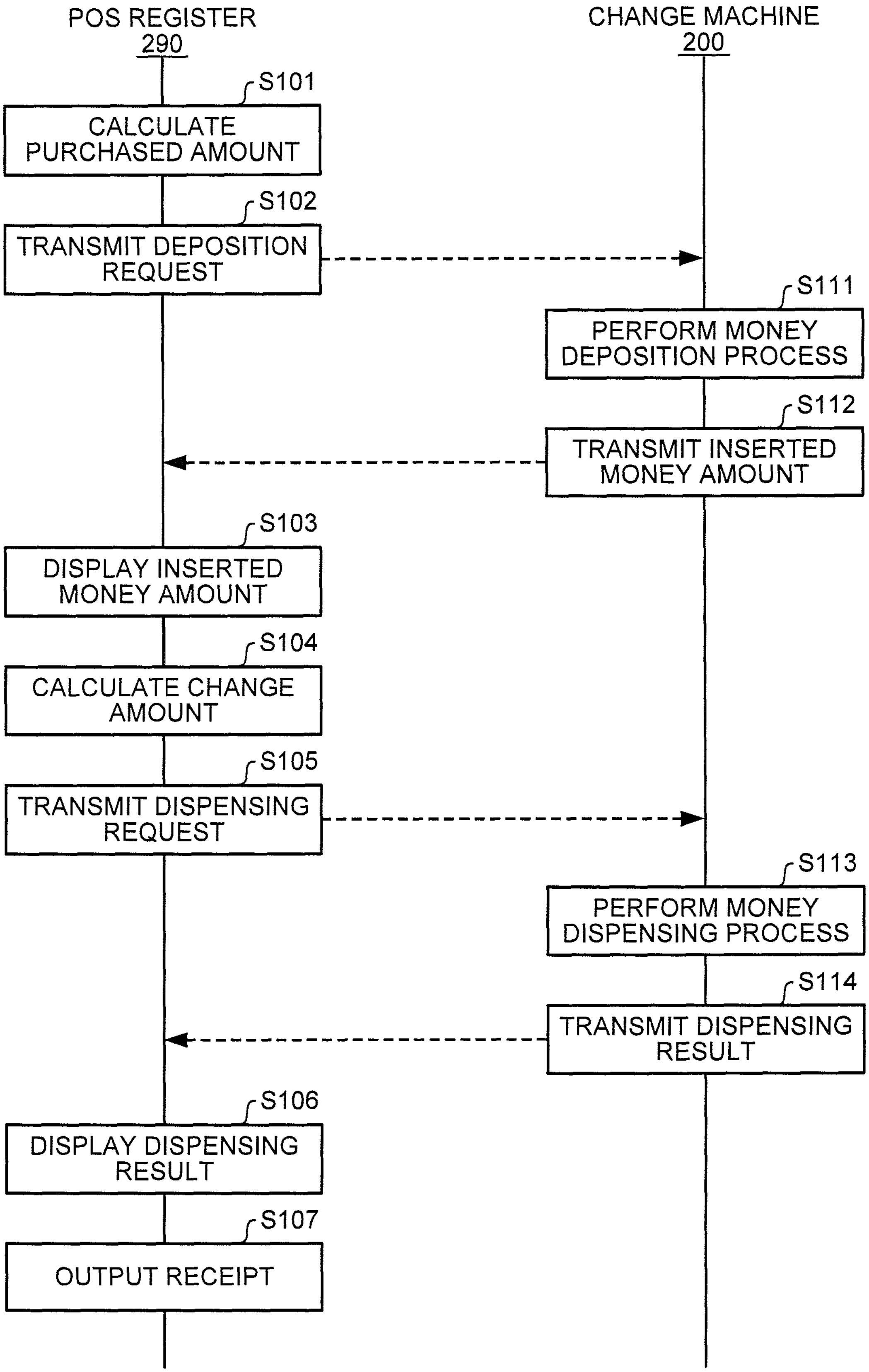
FIG. 9 is a flowchart of a process procedure relating to a transaction performed on the money handling system.

A process procedure performed by the money handling system is explained next. FIG. 9 is a flowchart of a process procedure relating to a transaction performed by the money handling system. To begin with, the POS register 290 calculates the purchased amount based on the information relating to the product acquired by the barcode reader 298 and/or the information relating to the product input by using the operation unit 294 (Step S101). Then, the POS register 290 transmits the deposition request to the change machine 200 (Step S102).

The change machine 200 receives the deposition request from the POS register 290, performs the money deposition process by transporting to the corresponding storing unit the money inserted by the operator (Step S111), and transmits the inserted money amount to the POS register 290 (Step S112).

The POS register 290 displays the inserted money amount (Step S103), calculates the difference between the purchased amount and the inserted money amount as the change amount (Step S104), and transmits to the change machine 200 the dispensing request including the most appropriate change configuration for which the total number of money for each denomination of money corresponding to the change amount becomes minimum (Step S105).

The change machine 200 receives the dispensing request from the POS register 290, performs the money dispensing process (Step S113), and transmits the dispensing result to the POS register 290 (Step S114).

The POS register 290 receives the dispensing result from the change machine 200 and displays the dispensing result (Step S106). At this time, if the substitute dispensing has been performed, the fact that the substitute dispensing has been performed is displayed. Then, the POS register 290 establishes the settlement of the product and outputs a receipt (Step S107), and finishes the process.

Figure 10:
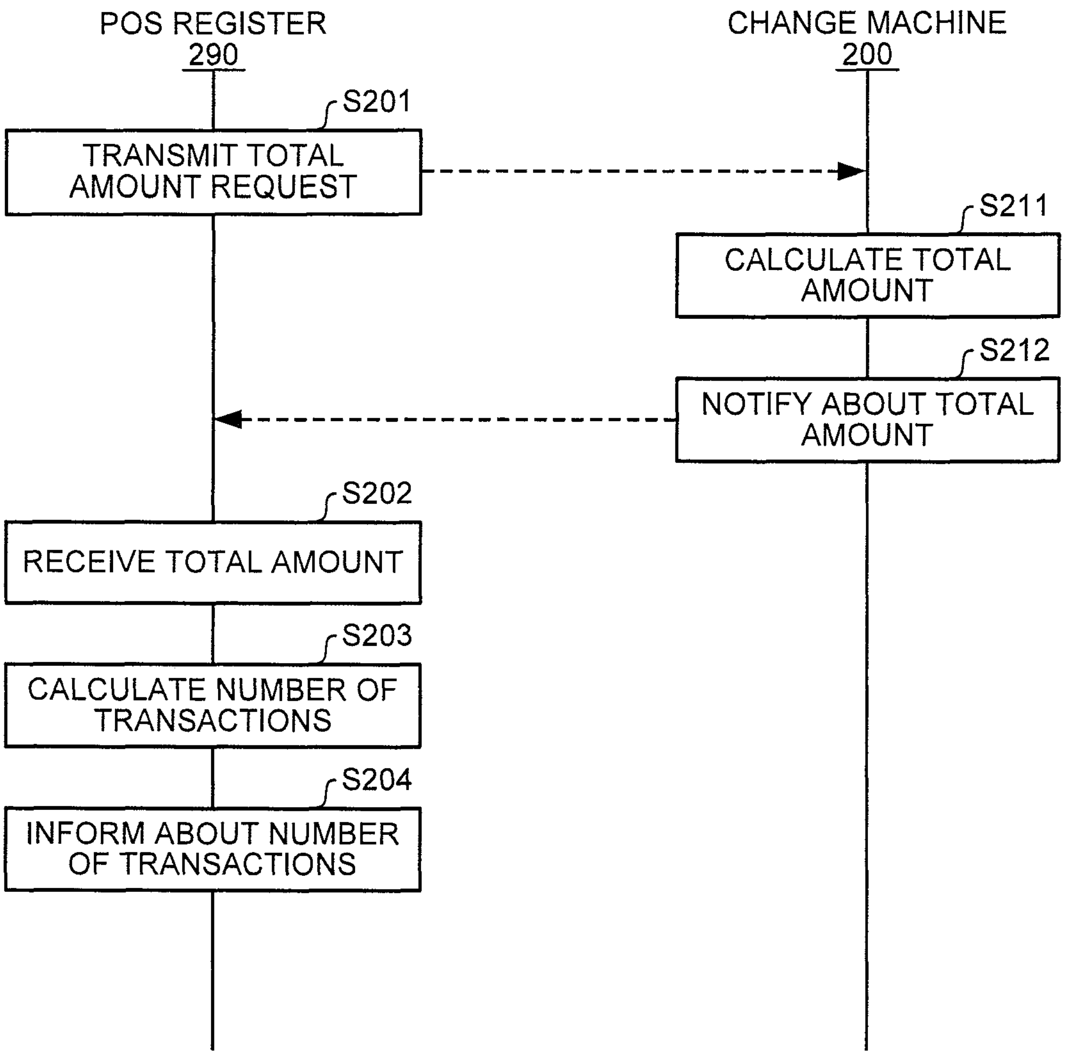
FIG. 10 is a flowchart of a process procedure relating to informing about number of transactions.

FIG. 10 is a flowchart of a process procedure relating to informing about the number of transactions. To begin with, the POS register 290 transmits the total amount request to the change machine 200 (Step S201). Upon receiving the total amount request from the POS register 290, the change machine 200 calculates the total amount of money that can be dispensed as the change (Step S211) and notifies the POS register 290 of the total amount of money (Step S212). Note that, when the total amount included in the inventory amount data 205*a* is itself to be taken as the total amount of money that can be dispensed as the change, since it is redundant to recalculate the same, the same can be read from the inventory amount data 205*a* and notified to the POS register 290.

Upon receiving the total amount from the change machine 200 (Step S202), the POS register 290 calculates the number of transactions for which the change can be dispensed (Step S203). Then, the POS register 290 controls the display unit 293 to display the calculated number of transactions to inform the operator of the number of transactions (Step S204), and finishes the process.

Variation

Figure 11:
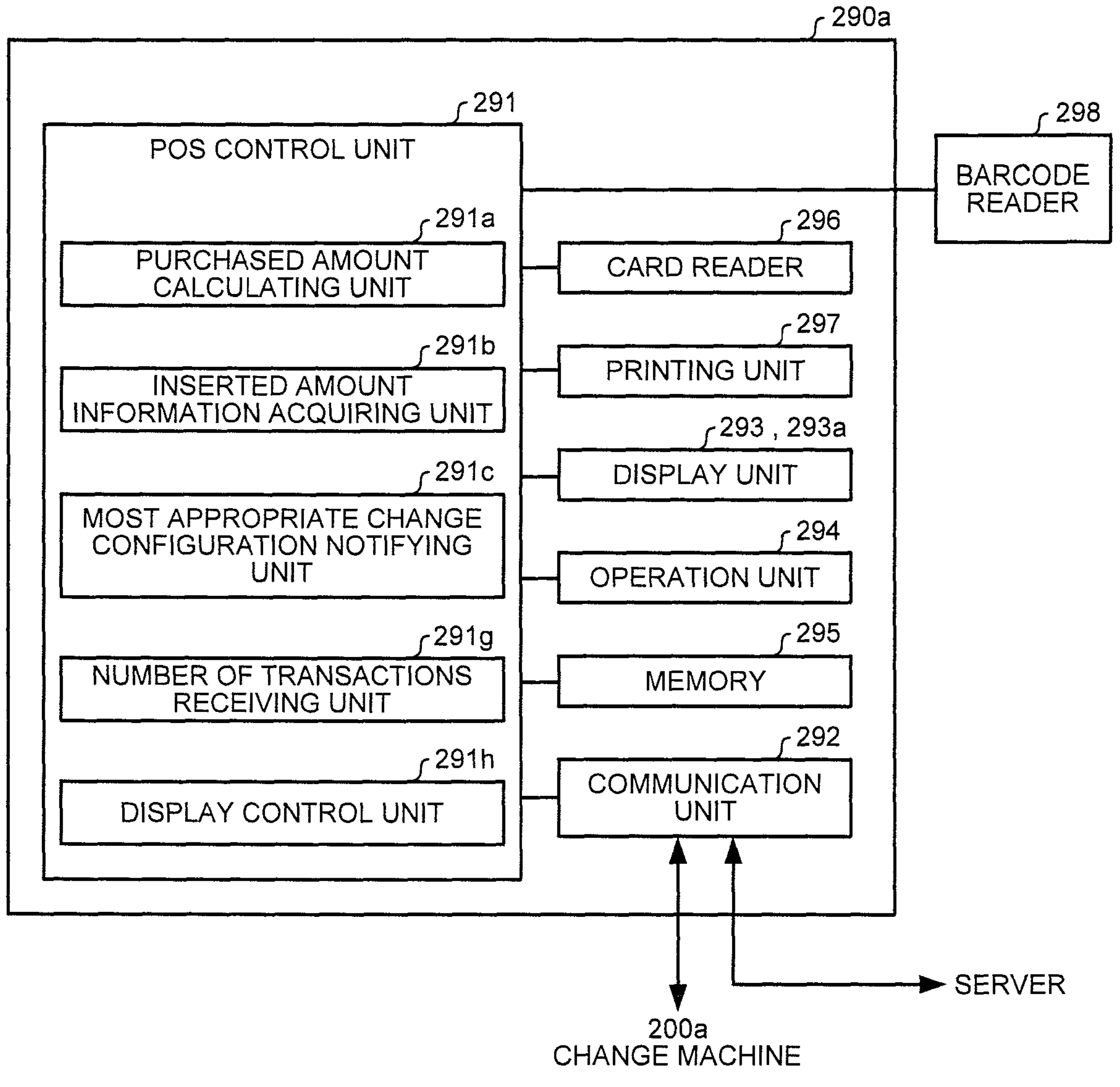
FIG. 11 is a structural diagram of a control system of the POS register in a configuration in which the change machine calculates the number of transactions.

In the explanation given above, a configuration in which the POS register calculates the number of transactions has been explained; however, the number of transactions can be calculated in the change machine. FIG. 11 is a structural diagram of a control system of the POS register in a configuration in which the change machine calculates the number of transactions. As shown in FIG. 11, the POS control unit 291 of a POS register 290*a* includes a number of transactions receiving unit 291*g* and a display control unit 291*h* in place of the total amount receiving unit 291*d*, the number of transactions calculating unit 291*e*, and the display control unit 291*f* shown in FIG. 5. Because the configuration and action other than this are similar to those of the POS register 290 shown in FIG. 5, the same reference numbers will be used to refer to the same structural components, and explanation thereof will be omitted.

The number of transactions receiving unit 291*g* is a processing unit that receives from a change machine 200*a* the number of transactions calculated by the change machine 200*a*. The display control unit 291*h* controls the display unit 293 to display the number of transactions received in the number of transactions receiving unit 291*g*. Moreover, the display control unit 291*h*, like the display control unit 291*f*, upon receiving information relating to the substitute dispensing from the change machine 200*a*, controls the display unit 293 to display the information relating to the substitute dispensing.

Figure 12:
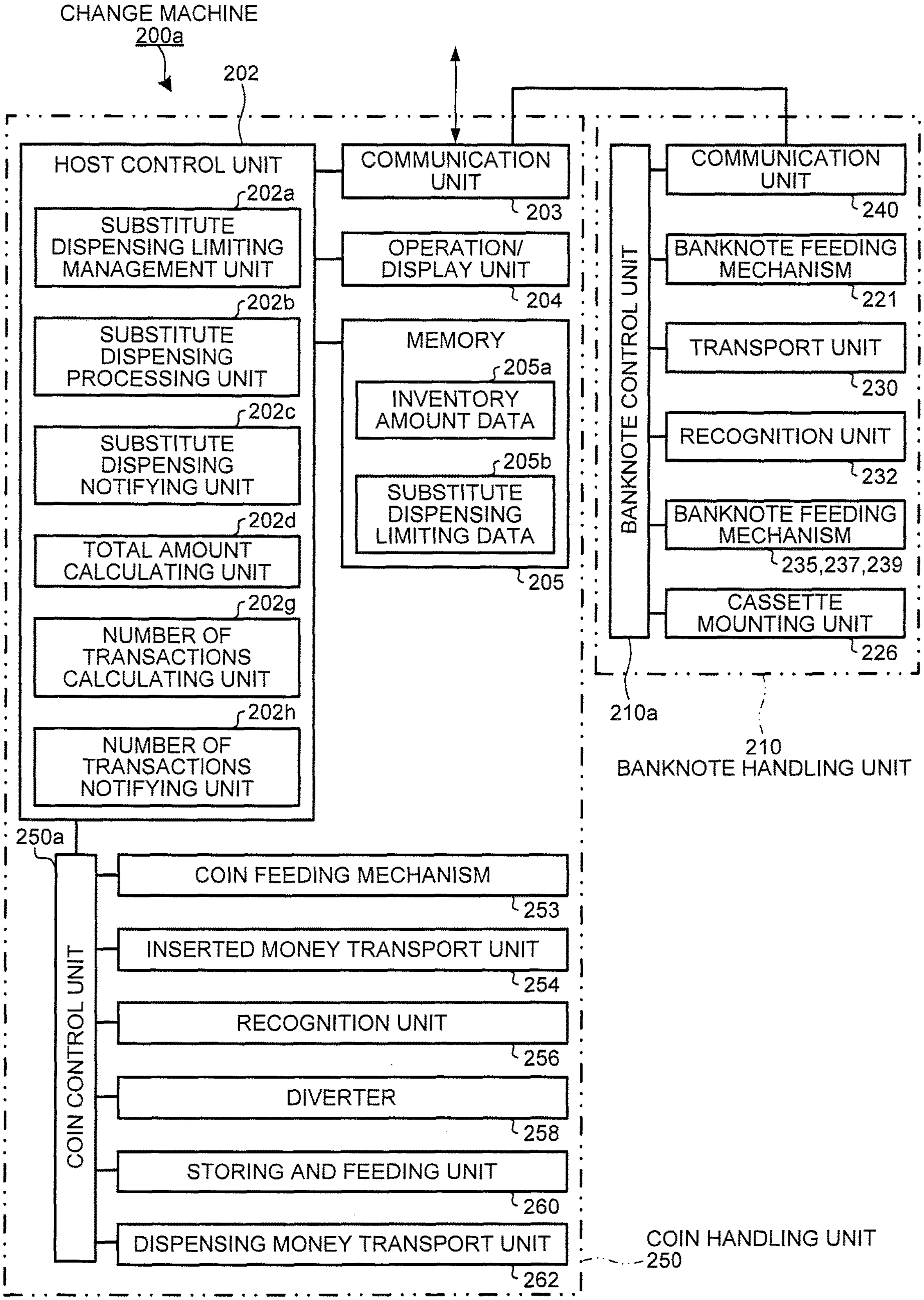
FIG. 12 is a structural diagram of a control system of the change machine that calculates the number of transactions.

FIG. 12 is a structural diagram of a control system of the change machine 200*a* that calculates the number of transactions. As shown in FIG. 12, the host control unit 202 of the change machine 200*a* includes a number of transactions calculating unit 202*g* and a number of transactions notifying unit 202*h* in place of the total amount notifying unit 202*e*. Because the configuration and action other than this are similar to those of the change machine 200 shown in FIG. 6, the same reference numbers will be used to refer to the same structural components, and explanation thereof will be omitted.

The number of transactions calculating unit 202*g* is a processing unit that calculates the number of transactions from the total amount of money that can be dispensed as the change and calculated by the total amount calculating unit 202*d*. Specifically, the number of transactions is a quotient obtained by dividing the total amount by a value obtained by subtracting the lowest value of denominations from the highest value of denominations. The number of transactions notifying unit 202*h* transmits to the POS register 290*a* the number of transactions calculated by the number of transactions calculating unit 202*g*.

Figure 13:
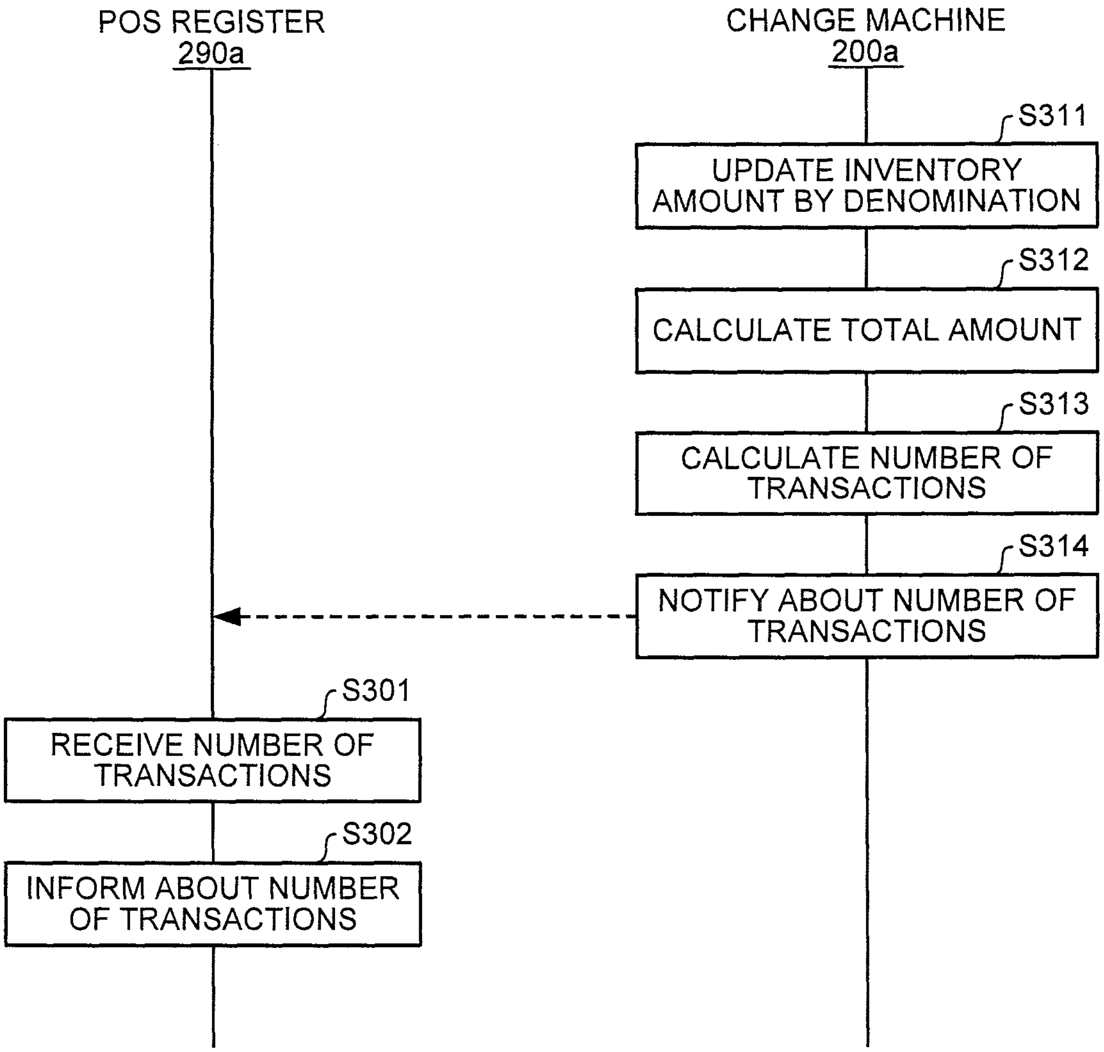
FIG. 13 is a flowchart of a process procedure followed by the change machine when calculating the number of transactions.

FIG. 13 is a flowchart of a process procedure followed by the change machine 200*a* when calculating the number of transactions. To begin with, if the inventory amount of one or more predetermined denominations in the inventory amount data 205*a* has been updated (Step S311), the total amount calculating unit 202*d* of the change machine 200*a* calculates the total amount of money that can be dispensed as the change (Step S312).

Then, the number of transactions calculating unit 202*g* of the change machine 200*a* calculates the number of transactions from the total amount of money that can be dispensed as the change (Step S313). The number of transactions notifying unit 202*h* notifies the POS register 290*a* of the number of transactions calculated by the number of transactions calculating unit 202*g* (Step S314).

When the number of transactions receiving unit 291*g* of the POS register 290*a* receives the number of transactions from the change machine 200*a* (Step S301), the display control unit 291*h* controls the display unit 293 to display the number of transactions to inform the operator of the number of transactions (Step S302), and the process is finished.

Figure 14:
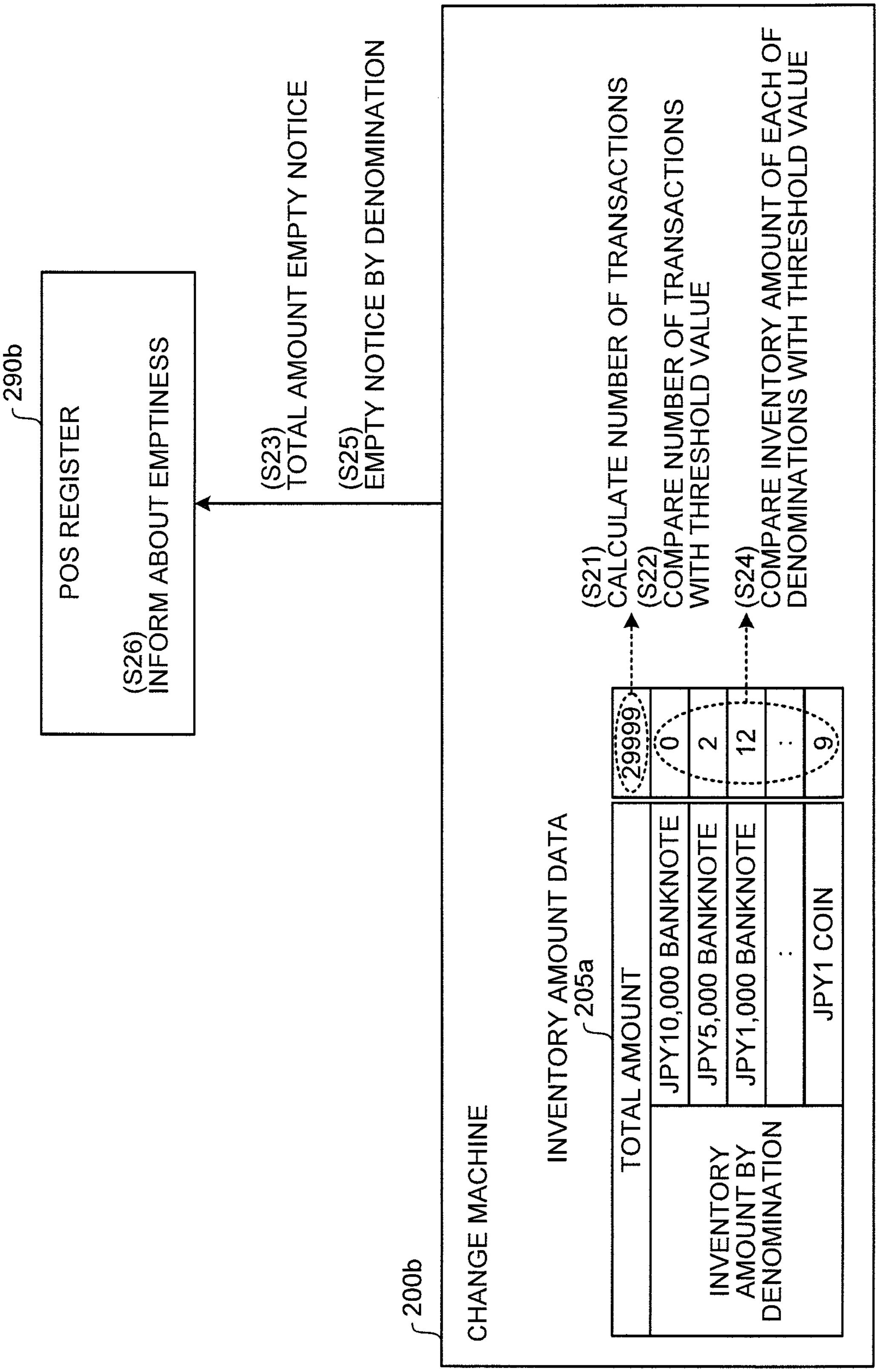
FIG. 14 is a view of a variation of a notice that includes the number of transactions.

A variation of a notice that includes the number of transactions is explained next. FIG. 14 is a view of the variation of the notice that includes the number of transactions. A change machine 200*b* shown in FIG. 14 calculates the number of transactions in the own device, like the change machine 200*a* (Step S21), and compares the number of transactions with a threshold value (Step S22). When the number of transactions is less than the threshold value, the change machine 200*b* sends a total amount empty notice to a POS register 290*b* (Step S23).

Moreover, the change machine 200*b* also compares the inventory amount of each of the denominations with a corresponding threshold value (Step S24), and sends an empty notice by the denomination to the POS register 290*b* for the denomination of which the inventory amount is less than the threshold value (Step S25).

Upon receiving the total amount empty notice or the empty notice by the denomination from the change machine 200*b*, the POS register 290*b* informs the operator of emptiness corresponding to the notice (Step S26). With this configuration, the POS register 290*b* can selectively inform the operator of the timing of replenishing the change.

Figure 15:
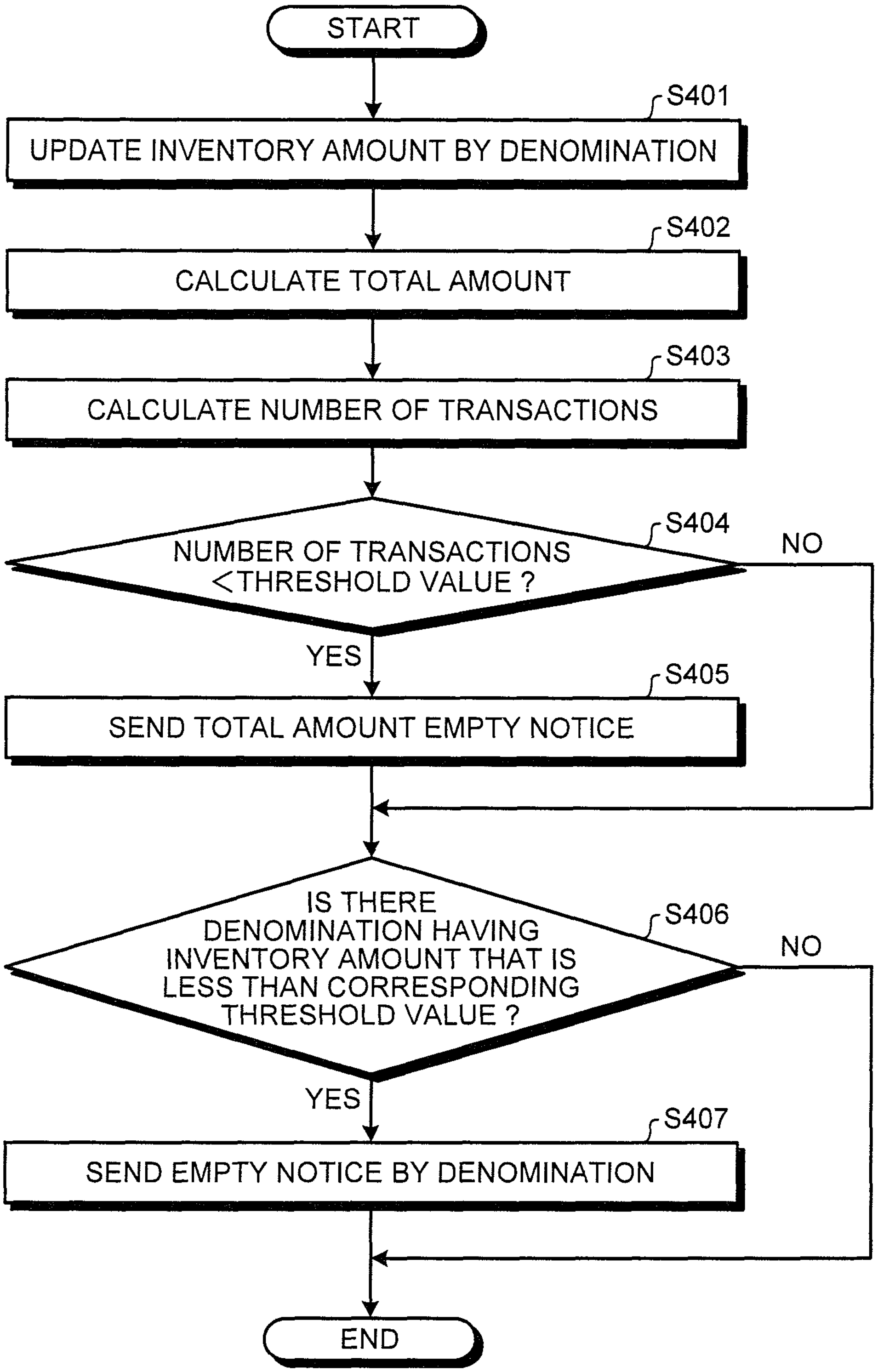
FIG. 15 is a flowchart of a process procedure performed by the POS register shown in FIG. 14.

FIG. 15 is a flowchart of a process procedure performed by the POS register 290*b* shown in FIG. 14. To begin with, if the inventory amount of one or more predetermined denominations in the inventory amount data 205*a* has been updated (Step S401), the change machine 200*b* calculates the total amount of money that can be dispensed as the change (Step S402).

Then, the change machine 200*b* calculates the number of transactions from the total amount of money that can be dispensed as the change (Step S403), and determines whether the number of transactions is less than the corresponding threshold value (Step S404). If the number of transactions is less than the threshold value (YES: Step S404), the change machine 200*b* sends the total amount empty notice to the POS register 290*b* (Step S405).

After Step S405, or if the number of transactions is equal to or more than the threshold value (No: Step S404), the change machine 200*b* determines whether there is a denomination having the inventory amount that is less than the corresponding threshold value (Step S406). If there is no denomination having the inventory amount that is less than the corresponding threshold value (No: Step S406), the process is finished. On the other hand, if there is a denomination having the inventory amount that is less than the corresponding threshold value (Yes: Step S406), the change machine 200*b* sends the empty notice by the denomination to the POS register 290*b* (Step S407) and finishes the process.

A variation of the number of transactions is explained next. In the explanation given above, a configuration in which the number of transactions is calculated from the total amount of all the money that can be dispensed as the change has been explained; however, it is allowable to calculate the total amount of money that can be dispensed as the change by digit, and calculate number of transactions by digit.

Figure 16:
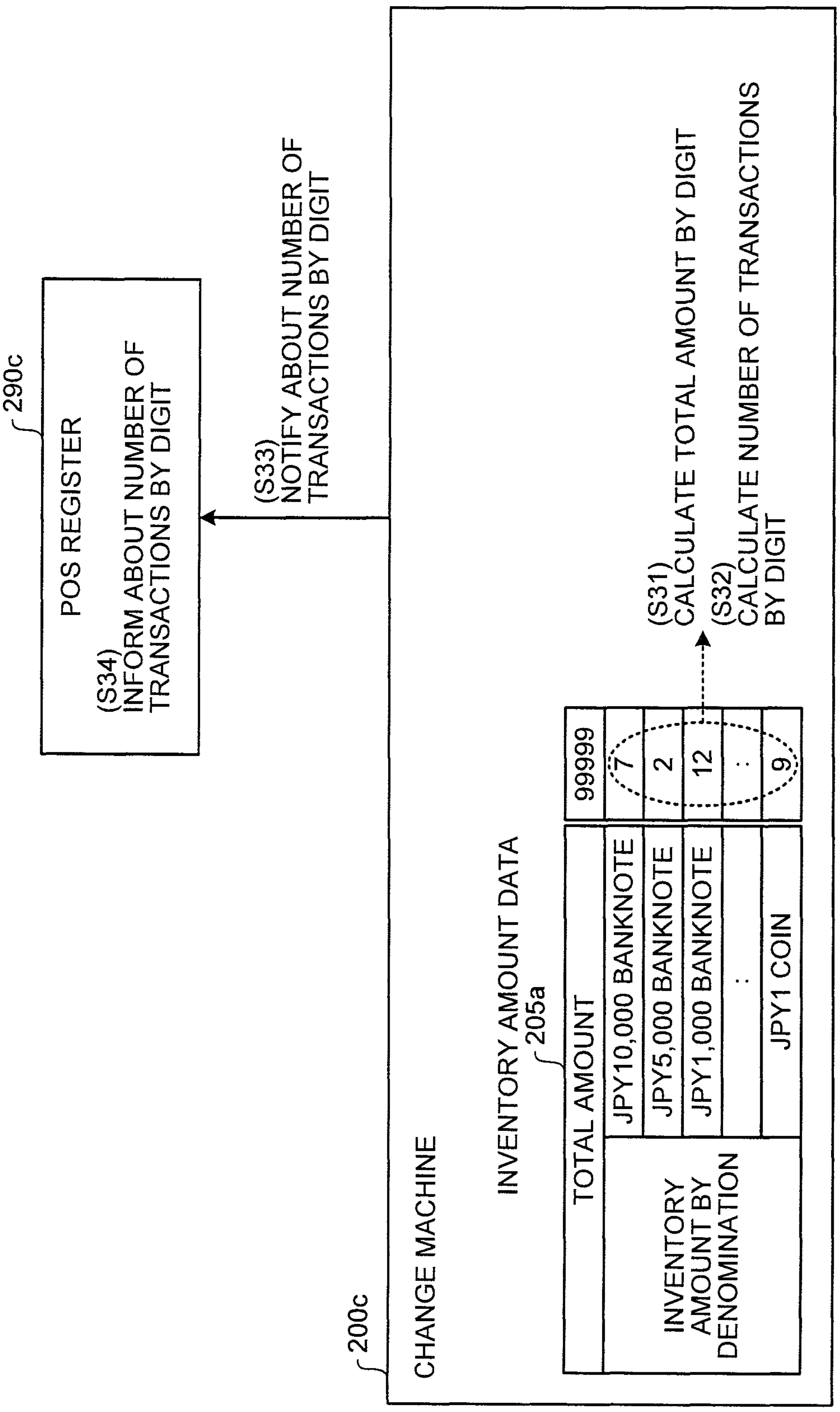
FIG. 16 is a view for explaining informing about number of transactions by digit.

FIG. 16 is a view for explaining informing about the number of transactions by digit. In the inventory amount data 205*a* shown in FIG. 16, the inventory amount of the JPY10,000 banknote is "7", the inventory amount of the JPY5,000 banknote is "2", the inventory amount of the JPY1,000 banknote is "12", the inventory amount of the JPY1 coin is "9", and the like, that is, the inventory amount is shown of one or more predetermined denominations, and the total amount is "JPY99,999".

A change machine 200*c* shown in FIG. 16 calculates the total amount of money that can be dispensed as the change by digit from the inventory amount data 205*a*. Specifically, the change machine 200*c* calculates the total amount of money that can be dispensed as the change with JPY1,000 unit, the total amount of money that can be dispensed as the change with JPY100 unit, the total amount of money that can be dispensed as the change with JPY10 unit, and the total amount of money that can be dispensed as the change with JPY1 unit (Step S31). Then, the change machine 200*c* calculates the number of transactions by digit from the total amount by digit (Step S32), and notifies the POS register 290 of the number of transactions by digit (Step S33). Accordingly, a POS register 290*c* informs the operator of the number of transactions by digit (Step S34).

FIG. 17 is a view for explaining a total amount and number of transactions by digit. The inventory amount data 205*a* shown in FIG. 17 shows that the total amount of the inventory amount is "JPY99,999", the inventory amount of the JPY10,000 banknote is "7", the inventory amount of the JPY5,000 banknote is "2", the inventory amount of the JPY1,000 banknote is "12", the inventory amount of the JPY500 coin is "6", the inventory amount of the JPY100 coin is "44", the inventory amount of the JPY50 coin is "5", the inventory amount of the JPY10 coin is "32", the inventory amount of the JPY5 coin is "4", and the inventory amount of the JPY1 coin is "9".

Among these, because the JPY10,000 banknote has the highest value and it is never used as the change, the inventory amount of this banknotes is not used. Moreover, it is decided that the 5-denomination system lower by one digit than the denomination of the highest value is also not used for the total amount of money that can be dispensed as the change.

The JPY1,000 banknote and the JPY500 coin, which belong to the 5-denomination system but one digit lower, are used as the total amount of money that can be dispensed as the change for JPY1,000 digit (change inventory amount for JPY1,000). In FIG. 17, because the inventory amount of the JPY1,000 banknote is "12" and the inventory amount of the JPY500 coin is "6", the change inventory amount for JPY1,000 is "JPY15,000".

The number of transactions of JPY1,000 digit is a quotient obtained by dividing the change inventory amount for JPY1,000 by "9000". Accordingly, as shown in FIG. 17, the number of transactions of JPY1,000 digit will be "1".

The JPY100 coin and the JPY50 coin, which belong to the 5-denomination system but one digit lower, are used as the total amount of money that can be dispensed as the change for JPY100 digit (change inventory amount for JPY100). It is decided that the JPY500 coin, which is the 5-denomination system of the same digit as the JPY100 coin, is also not used for the total amount of money that can be dispensed as the change. In FIG. 17, the inventory amount of the JPY100 coin is "44" and the inventory amount of the JPY50 coin is "5". Though the inventory amount of the JPY50 coin is JPY250, because it is assumed to dispense as the change for JPY100 digit, an amount below JPY100 is rounded off. Accordingly, the change inventory amount for JPY100 is "JPY4,600".

The number of transactions of JPY100 digit is a quotient obtained by dividing the change inventory amount for JPY100 by "900". Accordingly, as shown in FIG. 17, the number of transactions of JPY100 digit will be "5".

The JPY10 coin and the JPY1 coin, which belong to the 5-denomination system but one digit lower, are used as the total amount of money that can be dispensed as the change for JPY10 digit (change inventory amount for JPY10). It is decided that the JPY50 coin, which is the 5-denomination system of the same digit as the JPY10 coin, is not used for the total amount of money that can be dispensed as the change. In FIG. 17, the inventory amount of the JPY10 coin is "32" and the inventory amount of the JPY5 coin is "4". Accordingly, the change inventory amount for JPY10 is "JPY340".

The number of transactions of JPY10 digit is a quotient obtained by dividing the change inventory amount for JPY10 by "90". Accordingly, as shown in FIG. 17, the number of transactions of JPY10 digit will be "3".

The inventory amount of the JPY1 coin is used as the total amount of money that can be dispensed as the change for JPY1 digit (change inventory amount for JPY1). Accordingly, the change inventory amount for JPY1 is "JPY9".

The number of transactions of JPY1 digit is a quotient obtained by dividing the change inventory amount for JPY1 by "9". Accordingly, as shown in FIG. 17, the number of transactions of JPY1 digit will be "1".

In FIG. 17, a configuration has been explained in which the change machine 200*c* calculates the number of transactions by digit and the total amount by digit and notifies the POS register 290*c* of the calculated values. However, it is allowable that the change machine 200*c* notifies the POS register 290*c* of the inventory amount of one or more predetermined denominations and the POS register 290*c* calculates the number of transactions by digit and the total amount by digit based on the inventory amount of one or more predetermined denominations.

Moreover, it is allowable to calculate the total amount by digit and the number of transactions by digit at the time point at which the inventory amount of one or more predetermined denominations is updated, and store the calculated values somewhere. Alternatively, the total amount by digit and the number of transactions by digit can be calculated when it is necessary to display those values. Moreover, it is allowable to inform the operator of both the total amount by digit and the number of transactions by digit. Alternatively, one between the total amount by digit and the number of transactions by digit can be selectively informed to the operator.

Inventory amount data for change will be explained here. FIG. 18 is a view for explaining the inventory amount data for change. The inventory amount data 205*a* shown in FIG. 18 shows that the total amount of the inventory amount is "JPY99,999", the inventory amount of the JPY10,000 banknote is "7", the inventory amount of the JPY5,000 banknote is "2", the inventory amount of the JPY1,000 banknote is "12", the inventory amount of the JPY500 coin is "6", the inventory amount of the JPY100 coin is "44", the inventory amount of the JPY50 coin is "5", the inventory amount of the JPY10 coin is "32", the inventory amount of the JPY5 coin is "4", and the inventory amount of the JPY1 coin is "9".

Among the inventory amount of one or more predetermined denominations shown in the inventory amount data 205*a*, the JPY10,000 banknote that has the highest value is never used as the change. Accordingly, the inventory amount data for change can be obtained by excluding the inventory amount of the JPY10,000 banknote from the inventory amount data 205*a*.

The inventory amount data for change shown in FIG. 18 shows that the inventory amount of the JPY5,000 banknote is "2", the inventory amount of the JPY1,000 banknote is "12", the inventory amount of the JPY500 coin is "6", the inventory amount of the JPY100 coin is "44", the inventory amount of the JPY50 coin is "5", the inventory amount of the JPY10 coin is "32", the inventory amount of the JPY5 coin is "4", and the inventory amount of the JPY1 coin is "9". Therefore, the total amount of the money for the change is "JPY29,999".

In this manner, because the total amount of the money for the change is calculated by excluding the money that is not to be used as the change and the number of transactions is obtained from thus calculated total amount, the number of transactions can be obtained more correctly. For example, if the number of transactions is obtained from the total amount "JPY99,999" included in the inventory amount data 205*a* shown in FIG. 18, it will be "10". However, actually, because the amount JPY70,000 is in the JPY10,000 banknotes, a shortage of the change may occur in the number of transactions less than ten times. On the other hand, because the total amount "JPY29,999" of the money for the change is obtained from the inventory amount of available money as the change, a shortage of the change is less likely to occur in the transactions up to the number of transactions calculated from this total amount "JPY29, 999", that is, up to three transactions.

An example in which the JPY10,000 banknote that is the denomination having the highest value is excluded has been explained above. However, for example, the total amount of the money for the change can be obtained by excluding a desired denomination such as the JPY2,000 banknote and/or the JPY5,000 banknote.

Moreover, the total amount of the money for the change can be used to calculate the total amount by digit and the number of transactions. Furthermore, the total amount of the money for the change can be calculated at a time point when the need arises, or can be calculated when the inventory amount of one or more predetermined denominations is updated, and the calculated value can be stored somewhere.

As has been explained above, according to the present embodiment, by calculating the number of transactions for which the change can be dispensed based on the total amount of money stored in the change machine and informing about the number of transactions, the number of transactions that can be performed by using an inventory amount of money in the change machine can be identified efficiently and the business efficiency can be improved.

Particularly, when performing the substitute dispensing of discharging the change by using the money of another denomination when the money of some denomination is short, because it is difficult to determine only from the number of money per denomination whether it is possible to dispense the change, the number of transactions calculated based on the total amount is an important factor.

Specifically, the total amount of money stored in the change machine is calculated, and, the number of transactions for which the change can be dispensed can be calculated by using the calculated total amount. Moreover, the number of transactions can be calculated from the number of money of one or more predetermined denominations stored in the change machine and the total amount of money stored in the change machine. Furthermore, when performing the substitute dispensing by using, in substitution of the money of a certain denomination, several less value money than the money of the certain denomination, a total amount of the money of the certain denomination and the less value money of the denomination than the money of the certain denomination can be calculated and used. Note that, when a condition has been set for the substitute dispensing, the total amount is calculated within the condition. Moreover, when performing the substitute dispensing, along with the number of transactions, customer confirmation information for the less value money to be used in the substitute dispensing can be informed.

Note that, in the above embodiment, the present invention has been applied to the money handling system of the convenience store, the supermarket, and the like; however, the present invention is not limited to this. The present invention can be applied to a desired money handling system that dispenses the change.

In the above embodiment, there is explained a configuration example in which the POS register identifies the most appropriate change configuration and transmits to the change machine the dispensing request that specifies the denomination and the number of change. Alternatively, the POS register can transmit to the change machine the dispensing request that specifies the change amount, and the change machine can identify the most appropriate change configuration corresponding to the change amount.

In the above embodiment, there is explained a configuration example in which the POS register calculates the change and transmits the dispensing request to the change machine. Alternatively, the POS register can transmit the purchased amount to the change machine, and the change machine can calculate the change amount based on the purchased amount.

Without limiting to the case of dispensing the money when there is a shortage of the inventory amount, the substitute dispensing can be performed to adjust the inventory amount. That is, the denomination whose inventory amount is less than a predetermined value can be replaced with other denomination, and the denomination whose inventory amount is higher than a predetermined value can be used in place of other denomination. Accordingly, the inventory amount of each of the denominations can be maintained in an appropriate range.

The customer can be notified of the fact that the substitute dispensing is about to be performed, and the substitute dispensing can only be performed after obtaining a permission for the substitute dispensing from the customer.

The substitute dispensing can be performed based on such a request from the customer. For example, upon receiving a request from the customer that he would like to get a change of JPY500 all in the JPY100 coins, the change can be dispensed in the substitute change configuration that follows the request from the customer.

In response to a request and the like from the customer, the substitute dispensing can be performed after temporarily canceling the limit set in the substitute dispensing limiting data 205*b*.

The various structural components mentioned in the above embodiments are functional and are not necessarily present physically. That is, decentralization and/or unification of various components are not limited to that shown in the drawings. All of or some of the components can be decentralized and/or unified in desired units, functionally or physically, depending on various load, operating conditions, and the like.

To solve the above problems and to achieve the above object, a money handling system according to one aspect of the present invention is a money handling system in which a cash register and a change machine having a storing unit for storing therein money are communicably connected to each other. The money handling system includes a number of transactions calculating unit that calculates a number of transactions for which change can be dispensed based on an amount of money stored in the storing unit.

The above money handling system further includes a total amount calculating unit that calculates a total amount of money stored in the storing unit. The number of transactions calculating unit calculates the number of transactions for which the change can be dispensed based on a total amount calculated by the total amount calculating unit.

The above money handling system further includes an informing unit that informs about the number of transactions calculated by the number of transactions calculating unit.

In the above money handling system, the number of transactions calculating unit calculates the number of transactions for which the change can be dispensed based on the number of money of one or more predetermined denominations stored in the storing unit and the total amount calculated by the total amount calculating unit.

In the above money handling system, the total amount calculating unit calculates, when performing substitute dispensing by using in substitution of money of a particular denomination a plurality of pieces of money each of smaller denomination than money of the particular denomination, a total amount of the money of the particular denomination and the pieces of money each of smaller denomination than money of the particular denomination.

The above money handling system further includes a condition setting unit that sets, when performing the substitute dispensing, a condition relating to the pieces of money each of smaller denomination than money of the particular denomination.

In the above money handling system, the informing unit, when performing the substitute dispensing, informs about the number of transactions calculated by the number of transactions calculating unit of the cash register and customer confirmation information for the pieces of money each of smaller denomination than money of the particular denomination.

A change machine according to another aspect of the present invention is a change machine that has a storing unit for storing therein money. The change machine includes a number of transactions calculating unit that calculates number of transactions for which change can be dispensed based on an amount of money stored in the storing unit; and a notifying unit that notifies a predetermined host device of the number of transactions calculated by the number of transactions calculating unit.

A cash register according to still another aspect of the present invention is a cash register that is communicably connected to a change machine that dispenses money of one or more predetermined denominations as change. The cash register includes a receiving unit that receives from the change machine information relating to an amount of money stored in a storing unit of the change machine; and a number of transactions calculating unit that calculates number of transactions for which change can be dispensed based on the amount of money stored in the storing unit of the change machine.

The above cash register further includes a display unit; and a display control unit that controls the display unit to display information relating to the number of transactions calculated by the number of transactions calculating unit.

A money handling method according to still another aspect of the present invention is a money handling method that is executed on a money handling system in which a cash register and a change machine having a storing unit for storing therein money are communicably connected to each other. The money handling method includes calculating a number of transactions for which change can be dispensed based on an amount of money stored in the storing unit; and informing about the number of transactions.

A money handling method according to still another aspect of the present invention is a money handling method that is performed on a change machine having a storing unit for storing therein money. The money handling method includes calculating a number of transactions for which change can be dispensed based on an amount of money stored in the storing unit; and notifying a predetermined host device of the number of transactions.

A money handling method according to still another aspect of the present invention is a money handling method that is performed on a cash register that is communicably connected to a change machine that dispenses money of one or more predetermined denominations as change. The money handling method includes receiving from the change machine information relating to an amount of money stored in a storing unit of the change machine; and calculating number of transactions for which the change can be dispensed based on the information relating to the amount of money stored in the storing unit of the change machine.

According to the present invention, the number of transactions that can be performed by using the inventory amount of money inside the change machine can be identified efficiently and the business efficiency can be improved.

A change machine, a money handling system, a cash register, and a money handling method according to the present invention are useful in that it is possible to efficiently identify the number of transactions that can be performed by using an inventory amount of money inside the change machine and to improve the business efficiency.

Although the invention has been explained with respect to specific embodiments for a complete and clear disclosure, the appended claims are not to be thus limited but are to be construed as embodying all modifications and alternative constructions that may occur to one skilled in the art that fairly fall within the basic teaching of the claims.

What is claimed is:

1. A money handling system in which a cash register and a change machine having a storing unit for storing therein money are communicably connected to each other, comprising:

a number of transactions calculating unit that calculates a number of transactions for which change can be dispensed based on a number of pieces of money of each denomination stored in the storing unit, a number of pieces of money of each denomination estimated as a necessary change money for one transaction, and a number of pieces of money of which denomination is smaller than a particular denomination and which is used in substitute for money of the particular denomination when performing substitute dispensing to dispense an amount of the money of the particular denomination; and an informing unit that provides information regarding the number of transactions calculated by the number of transactions calculating unit.

2. The money handling system as claimed in claim 1, further comprising:

a total amount calculating unit that calculates a total amount of money stored in the storing unit, wherein the number of transactions calculating unit calculates the number of transactions for which the change can be dispensed based on a total amount calculated by the total amount calculating unit.

3. The money handling system as claimed in claim 2, wherein the number of transactions calculating unit calculates the number of transactions for which change can be dispensed based on a number of money of one or more predetermined denominations stored in the storing unit and the total amount calculated by the total amount calculating unit.

4. The money handling system as claimed in claim 1, further comprising a condition setting unit that sets, when performing the substitute dispensing, a condition relating to the pieces of money each of smaller denomination than money of the particular denomination.

5. The money handling system as claimed in claim 1, wherein the informing unit, when performing the substitute dispensing, provides information regarding the number of transactions calculated by the number of transactions calculating unit of the cash register and customer confirmation information for the pieces of money each of smaller denomination than money of the particular denomination.

6. The money handling system as claimed in claim 1 further comprising:

a receiving unit that receives from the change machine information relating to an amount of money stored in a storing unit of the change machine; and a number of transactions calculating unit that calculates number of transactions for which change can be dispensed based on the amount of money stored in the storing unit of the change machine.

7. The money handling system as claimed in claim 6, further comprising:

a display unit; and a display control unit that controls the display unit to display information relating to the number of transactions calculated by the number of transactions calculating unit.

8. A money handling method performed by the money handling system of claim 1 comprising:

calculating a number of transactions for which change can be dispensed based on an amount of money of each denomination stored in the storing unit and a number of pieces of money of each denomination estimated as a necessary change money for one transaction, and a number of pieces of money of which denomination is smaller than a particular denomination and which is used in substitute for money of the particular denomination when performing substitute dispensing to dispense an amount of the money of the particular denomination; and informing about the number of transactions.

9. A money handling method performed by the money handling system of claim 1 comprising:

receiving from the change machine information relating to an amount of money stored in a storing unit of the change machine; and calculating number of transactions for which the change can be dispensed based on the information relating to the amount of money stored in the storing unit of the change machine and a number of pieces of money of each denomination estimated as a necessary change money for one transaction.

* * * * *